United States Patent
Tanaka

(10) Patent No.: US 8,081,479 B2
(45) Date of Patent: Dec. 20, 2011

(54) ELECTRONIC APPARATUS

(75) Inventor: Kaigo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 12/557,120

(22) Filed: Sep. 10, 2009

(65) Prior Publication Data
US 2010/0067205 A1 Mar. 18, 2010

(30) Foreign Application Priority Data

Sep. 12, 2008 (JP) .................................. 2008-235237

(51) Int. Cl.
*H05K 5/00* (2006.01)
(52) U.S. Cl. ....................................... 361/730
(58) Field of Classification Search .................... 361/730
See application file for complete search history.

(56) References Cited

U.S. PATENT DOCUMENTS

| 5,251,096 A | * | 10/1993 | Hosoi et al. .................... 361/695 |
| 5,331,508 A | * | 7/1994 | Hosoi et al. ................. 361/679.09 |
| 5,355,278 A | * | 10/1994 | Hosoi et al. ............... 361/679.09 |
| 5,715,139 A | * | 2/1998 | Nakajima ................. 361/679.55 |
| 5,784,256 A | * | 7/1998 | Nakamura et al. ............ 361/699 |
| 5,808,860 A | * | 9/1998 | Ohgami et al. .......... 361/679.09 |
| 5,898,567 A | * | 4/1999 | Satake ...................... 361/679.09 |
| 5,923,530 A | * | 7/1999 | Murayama et al. ...... 361/679.09 |
| 6,101,088 A | * | 8/2000 | Nakajima et al. ........ 361/679.55 |
| 6,595,786 B2 | | 7/2003 | Horiuchi et al. |
| 7,719,824 B2 | * | 5/2010 | Tanaka et al. ............ 361/679.01 |
| 2008/0239641 A1 | * | 10/2008 | Sato et al. ..................... 361/681 |

FOREIGN PATENT DOCUMENTS

| JP | 2001-014062 A | | 1/2001 |
| JP | 2001-297813 A | | 10/2001 |
| JP | 2007-272402 A | | 10/2007 |
| JP | 2010067193 A | * | 3/2010 |

* cited by examiner

*Primary Examiner* — Lisa Lea Edmonds

(57) ABSTRACT

An electronic apparatus includes a circuit board having a connector mounted at an end edge and a metal member reinforcing the connector, the connector including a fitting surface of the connector facing outside; a housing which accommodates the circuit board and includes a first opening for a keyboard arrangement formed in an upper surface thereof and a second opening for fitting with a mating connector formed on a side surface thereof, the second opening facing the fitting surface of the connector mounted on the circuit board; and a keyboard exposed to the outside from the first opening and having a plurality of keys arranged on an upper surface thereof. The metal member extends under the keyboard and supports a portion of the lower surface of the keyboard.

4 Claims, 39 Drawing Sheets

810

ELECTRONIC APPARATUS

CROSS-REFERENCE TO RELATED APPLICATIONS

This application is based upon and claims the benefit of priority from the prior Japanese Patent Application No. 2008-235237 filed on Sep. 12, 2008, the entire contents of which are incorporated herein by reference.

FIELD

The embodiment described herein relates to an electronic apparatus including a keyboard.

BACKGROUND

Recently, portable electronic apparatuses including a display for displaying information, such as portable telephones and laptop personal computers, are being widely used. There is a strong desire to reduce the size and weight of such portable electronic apparatuses as well as increase the speed of processing and the availability of multiple functions. In order to achieve these desired features, the electronic apparatus uses a display device using a thin light liquid crystal panel. Similarly, reduction in size and realization of high performance have progressed in electronic components built in the electronic apparatuses. However, there are limits to reducing the size and weight of the electronic components while maintaining the required performance. Thus, recently, the electronic apparatus is reduced in size and weight by improving, for example, the materials of the housing and controls, and by improving the configuration for fixing various components inside the housing.

For example, in order to reduce the weight of the housing, unnecessary portions of the housing and a cover for protecting electronic components are removed. For example, an electronic apparatus with a keyboard includes a metal plate provided above a precision electronic component such as a hard disk for the purpose of preventing the keyboard from contacting the electronic component. The keyboard is placed on the metal plate, and supported by the metal plate. However, in order to reduce the weight of the electronic apparatus, it is considered preferable to fix the keyboard to the housing by using, for example, a rib instead of the metal plate. However, keyboards are relatively heavy, and pressed downward when a user operates the keys. Thus, if the metal plate is removed, the strength of supporting the key tops from below is lost, whereby the strength of the keyboard becomes insufficient. In addition, a user has an unsatisfactory feeling for the operational feeling (clicking feeling) when pressing the keys.

With regard to the above problem, Japanese Patent Laid-Open Publication No. 2001-14062 discloses a technique of forming an opening in a receiving plate for receiving a keyboard, exposing a portion of a bracket of a hard disk drive through the opening, and mounting the keyboard on the receiving plate and the blanket. In this technique, a portion of a metal plate can be removed, and, at the same time, the strength of fixing the keyboard can be maintained to some extent by the blanket of the hard disk drive.

Recently, in order to further reduce the weight of the electronic apparatus, the receiving plate of the keyboard is made of not a metal plate but light plastic. In the electronic apparatus using light plastic, when only the blanket of the hard disk drive is used, the power of supporting the keyboard is insufficient, and therefore, consideration is required to increase the fixing strength of the keyboard.

SUMMARY

According to an aspect of an embodiment, an electronic apparatus includes a circuit board having a connector mounted at an end edge and a metal member reinforcing the connector, the connector including a fitting surface of the connector facing outside; a housing which accommodates the circuit board and includes a first opening for a keyboard arrangement formed in an upper surface thereof and a second opening for fitting with a mating connector formed on a side surface thereof, the second opening facing the fitting surface of the connector mounted on the circuit board; and a keyboard exposed to the outside from the first opening and having a plurality of keys arranged on an upper surface thereof. The metal member extends under the keyboard and supports a portion of the lower surface of the keyboard.

Additional aspects and/or advantages will be set forth in part in the description which follows and, in part, will be apparent from the description, or may be learned by practice of the invention.

The above-described embodiments of the present invention are intended as examples, and all embodiments of the present invention are not limited to including the features described above.

DETAILED DESCRIPTION OF THE EMBODIMENT

Hereinafter, an embodiment will be described with reference to the drawings.

Figure 1:
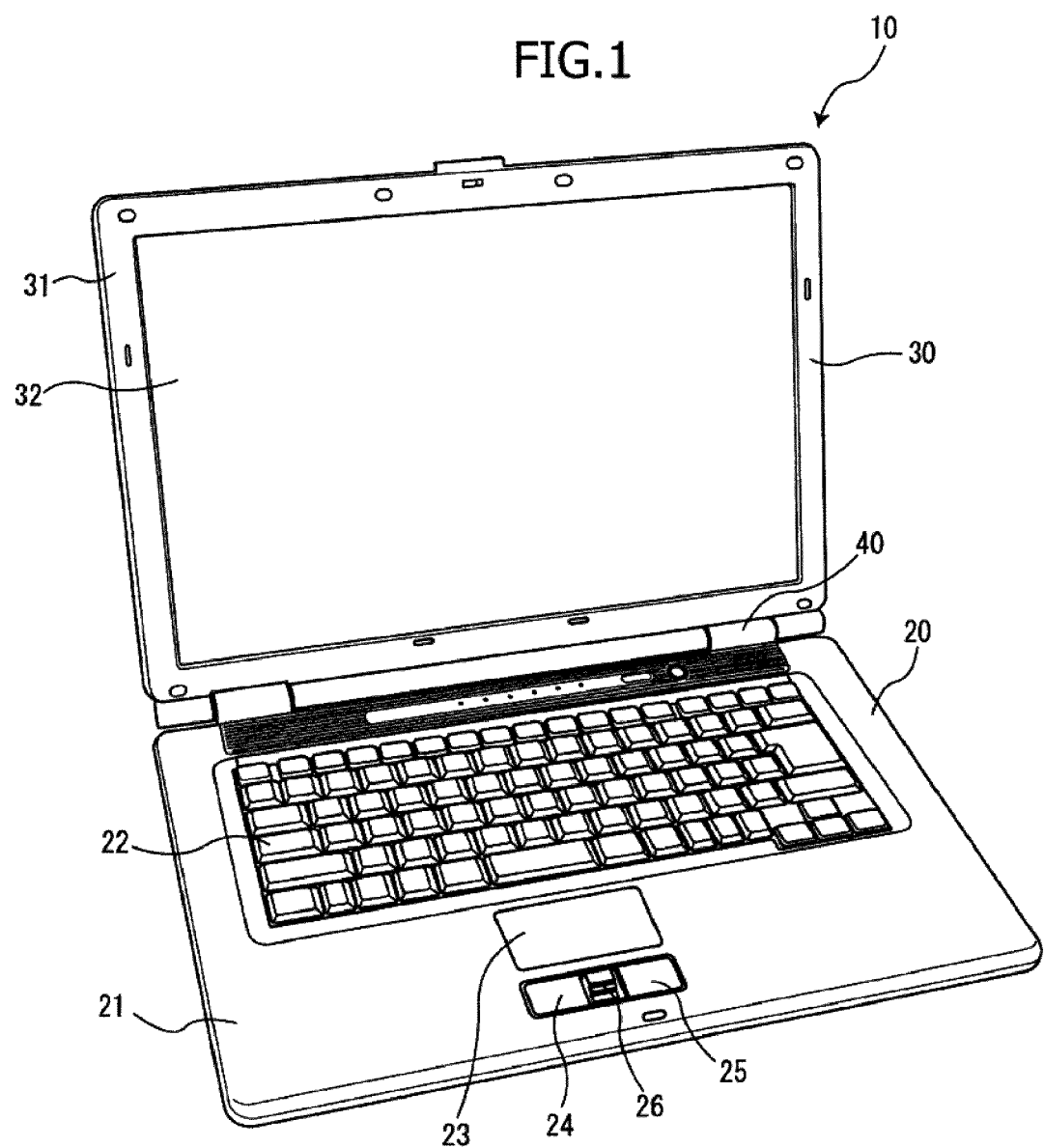
FIG. 1 depicts an appearance of a personal computer which is a specific first embodiment of an electronic apparatus.

FIG. 1 depicts an appearance of a personal computer 10 which is a specific first embodiment of an electronic apparatus.

The personal computer 10 includes a main unit 20 and a display unit 30. The display unit 30 is connected to the main unit 20 by a hinge 40 such that the display unit may be opened and closed. FIG. 1 is a front view of the personal computer 10 with the display unit 30 opened.

The main unit 20 is used for executing various information processes. The main unit 20 includes a CPU and a hard disk device accommodated in a main housing 21. The main housing 21 includes on its upper surface a keyboard 22, a trackpad 23, a left button 24, and a right button 25. The main housing 21 further includes a fingerprint sensor 26 provided between the left button 24 and the right button 25. A fingertip is swept across the fingerprint sensor 26, whereby fingerprint authentication is performed.

A result of the information processing performed by the main unit 20 is displayed on the display unit 30. The display unit 30 includes a display housing 31. The display housing 31 accommodates a thin liquid crystal panel, which has an image screen 32 on the front surface, a control circuit for the liquid crystal panel, and a communication antenna.

Figure 2:
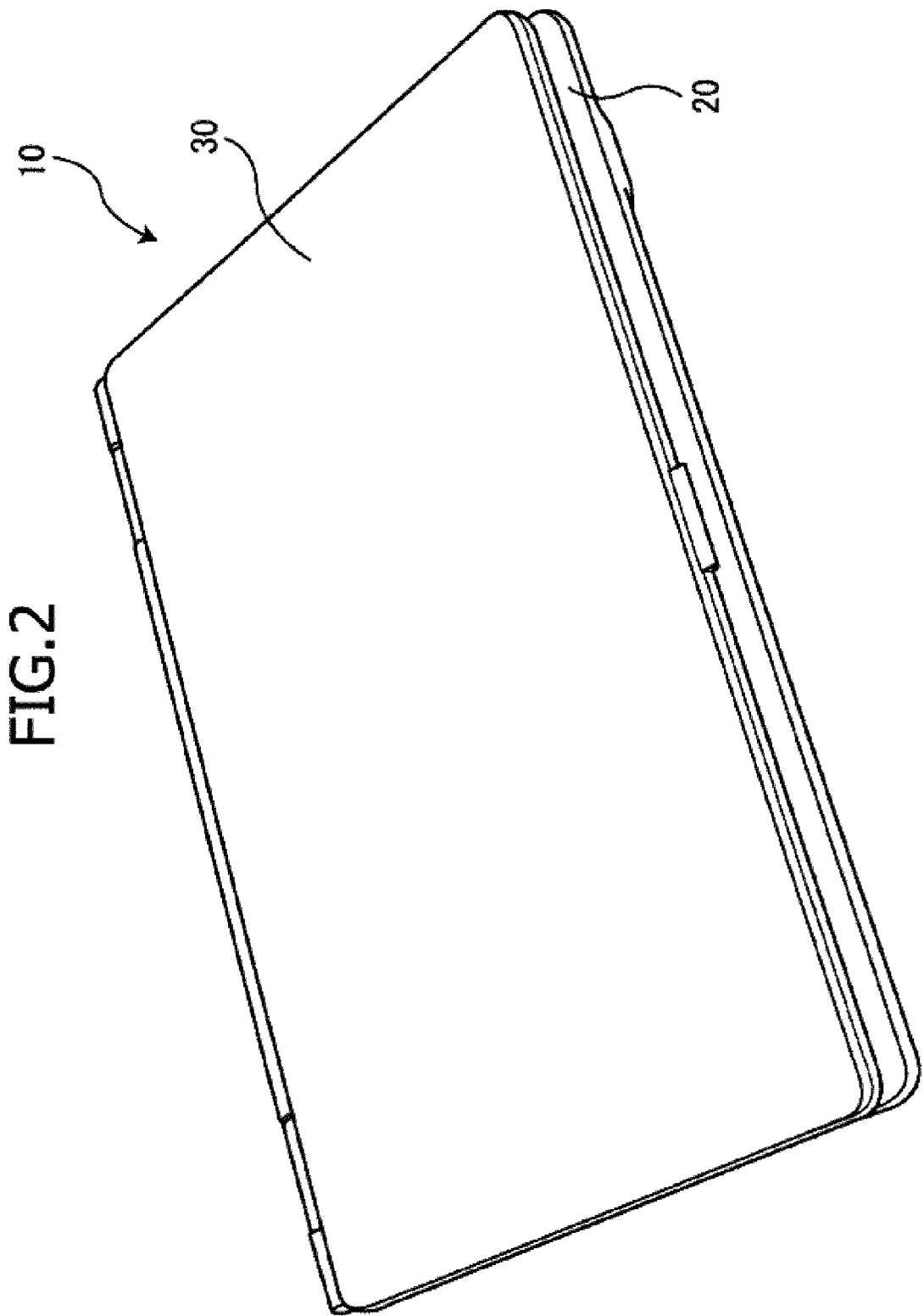
FIG. 2 depicts an appearance of a personal computer with a display unit closed.

FIG. 2 depicts an appearance of the personal computer 10 with the display unit 30 closed.

When the display unit 30, as depicted in FIG. 2, is closed with respect to the main unit 20 to shield the image screen 32 inside the display unit 30, a user may compactly carry the personal computer 10 without contaminating or damaging the image screen 32.

Figure 3:
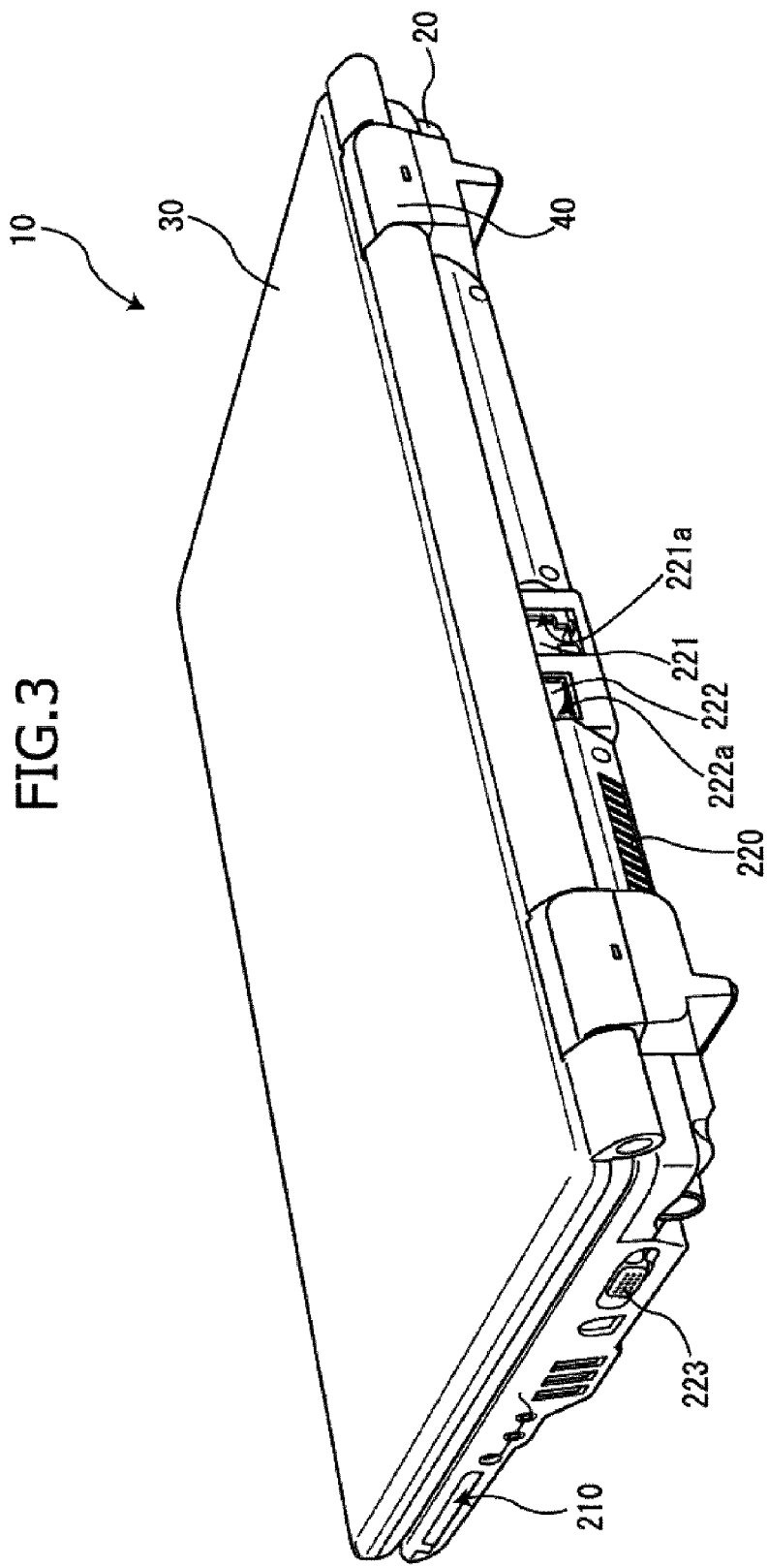
FIG. 3 depicts a rear surface and a side surface of a personal computer.

FIG. 3 depicts a rear surface and a side surface of the personal computer 10.

The main unit 20 includes, on its rear surface, a radiation outlet 220 and connector openings 221a and 222a for connector fitting. A LAN cable connector 221 and a USB connector 222 are exposed by the connector openings 221a and 222a, respectively. The main unit 20 further includes on its side surface an expansion card slot 210 and a modem connector 223. The expansion card slot 210 is used for loading an expansion card for function expansion, such as a LAN card. The main unit 20 further includes, on the side surface opposite the side surface depicted in FIG. 3, an optical disk storage opening (not shown) for loading an optical disk such as a CD and a DVD.

Figure 4:
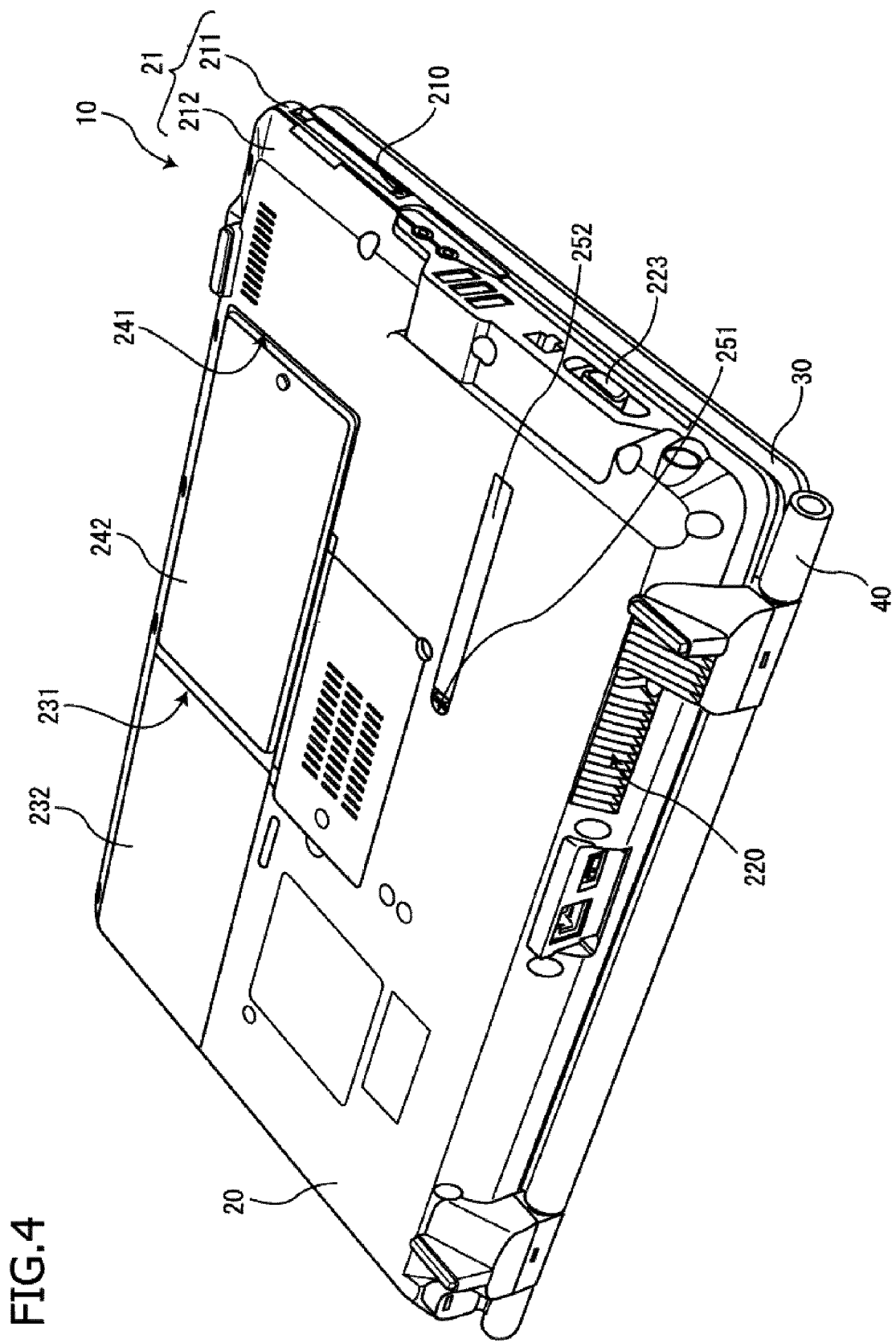
FIG. 4 depicts a bottom view of a personal computer.

FIG. 4 depicts the bottom surface of the personal computer 10.

A keyboard 22 (see FIG. 1) is fitted into the upper surface of the main housing 21 of the main unit 20. The main housing 21 is made up of an upper housing 211 with a circuit board fixed to the rear surface of the keyboard 22 and a lower cover 212 mounted on the upper housing 211. The main housing 21 includes a battery storage opening 231, a disk storage opening 241, and a filter storage opening 251. A battery pack is inserted into the battery storage opening 231. A hard disk drive is inserted into the disk storage opening 241. A dust filter 252 is loaded in the filter storage opening 251. A disk cover 242 is loaded in the disk storage opening 241. A battery cover 232 is loaded in the battery storage opening 231.

The personal computer 10 is basically configured as above.

Subsequently, each component of the personal computer 10 will be described in detail.

(Configuration of the Disk Storage Opening for Loading a Hard Disk Drive)

First, a configuration of the disk storage opening 241 loaded with a hard disk drive and the inside of the main housing 21 will be described.

The personal computer 10 includes:

a circuit board;

a housing which incorporates the circuit board and includes, on the bottom surface of the housing, an opening, through which a portion of one surface of the circuit board is visible, and a fastening hole;

an electronic component loaded into the opening and accommodated in the housing; and a fastening member inserted into the fastening hole and fixing the housing.

The housing has a rib which extends from the circumferential edge of the opening toward the circuit board over the entire circumference of the opening and prevents the fastening member that has fallen into the opening from entering the housing.

Figure 5:
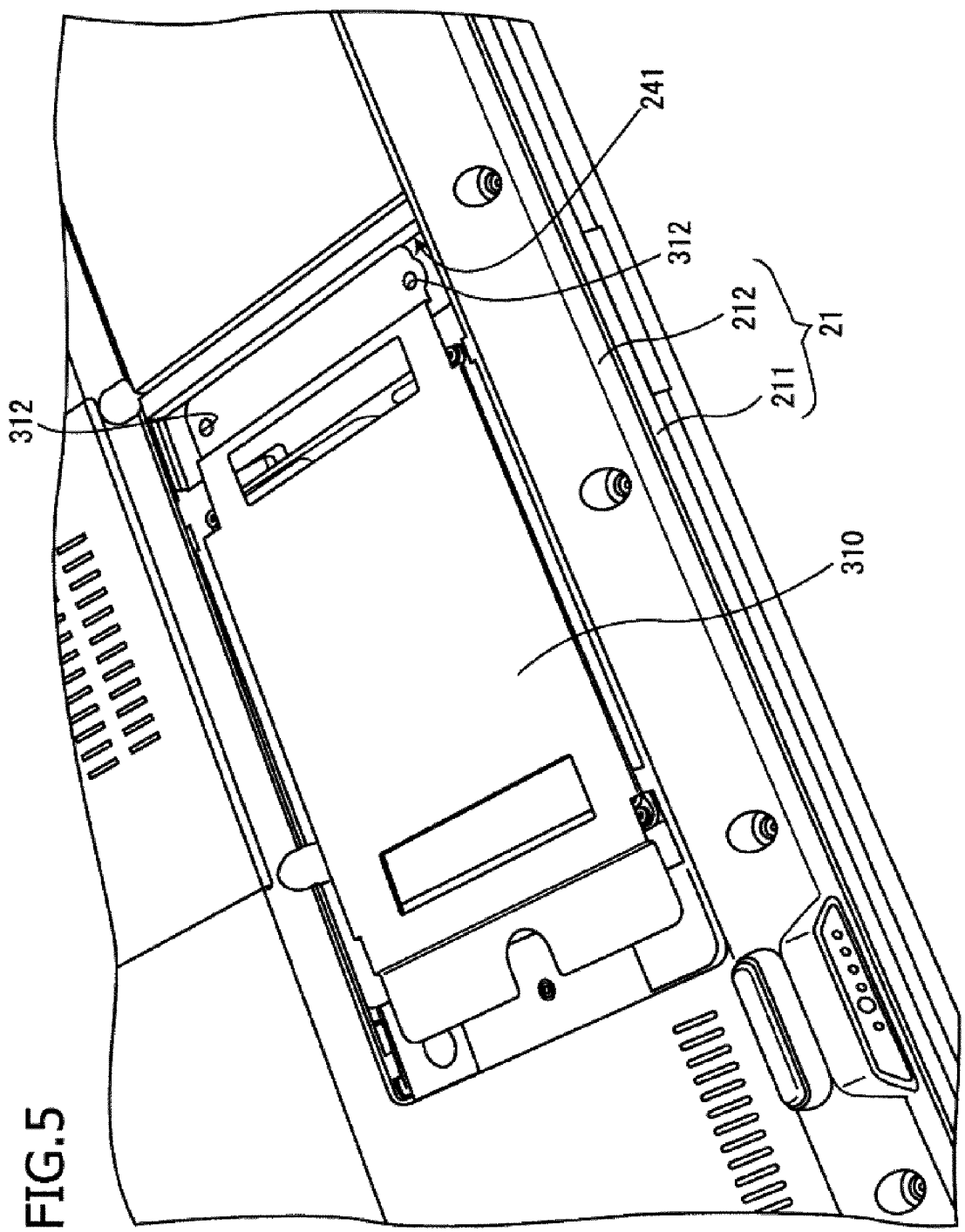
FIG. 5 depicts a state where a cover for a disk storage opening is removed from a main housing.

FIG. 5 depicts a state where the disk cover 242 for the disk storage opening 241 is removed from the main housing 21.

A hard disk drive unit 310 is fitted into the disk storage opening 241. The hard disk drive unit 310 is loaded into the disk storage opening 241, and thereafter, fixed to the main housing 21 by a plurality of screws 312. The hard disk drive unit 310 includes a hard disk drive 320 and a mounting member 330 for fixing the hard disk drive 320 to the main housing 21. After the hard disk drive unit 310 is fixed to the main housing 21, a disk cover 242 depicted in FIG. 4 is attached to the main housing 21. The main housing 21 is an example of the housing. The disk storage opening 241 is an example of the opening. The screws 312 are examples of the fastening member. The hard disk drive unit 310 is an example of the electronic component.

Figure 6:
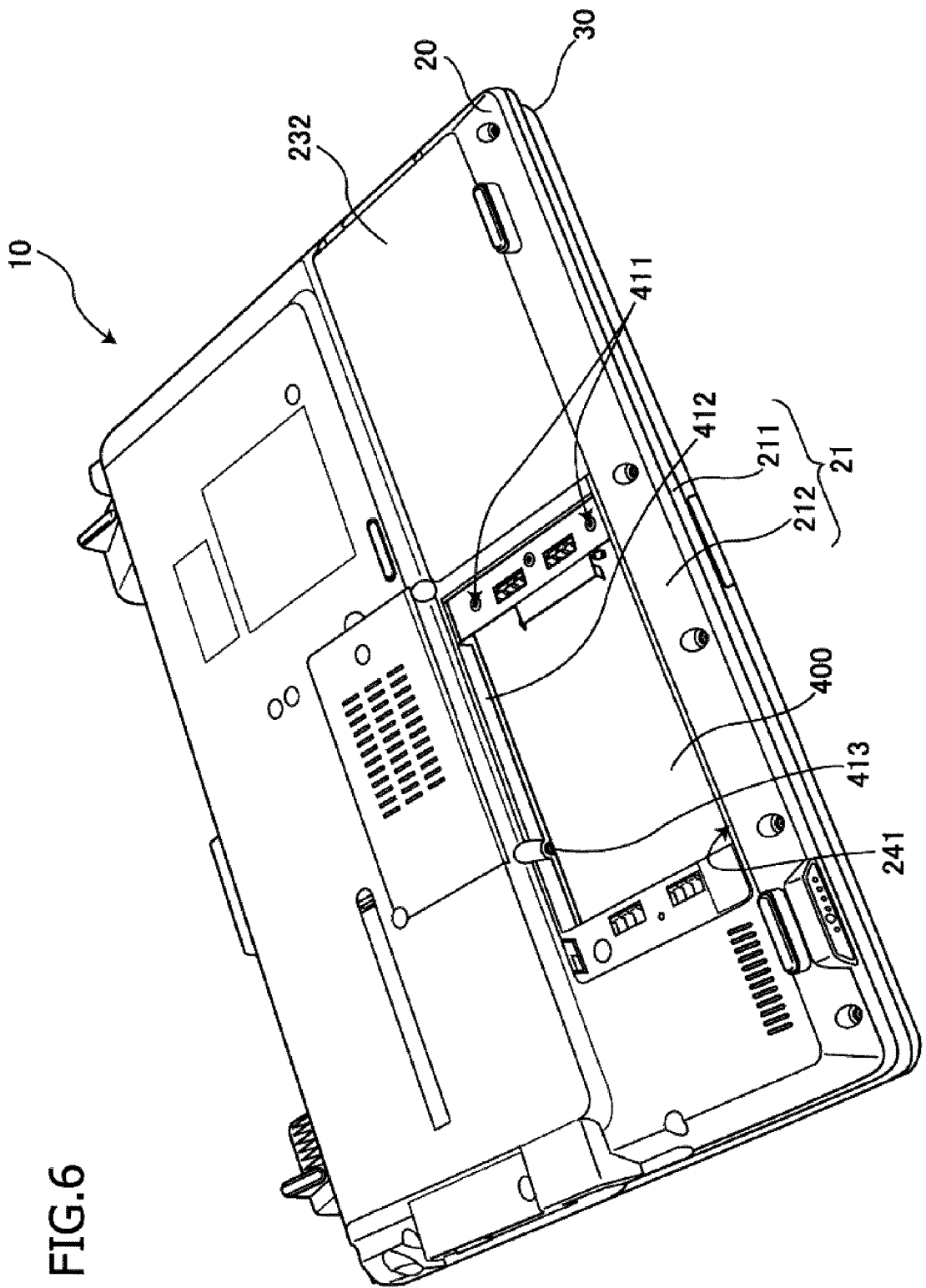
FIG. 6 depicts a state where a hard disk drive is removed from a disk storage opening.
Figure 7:
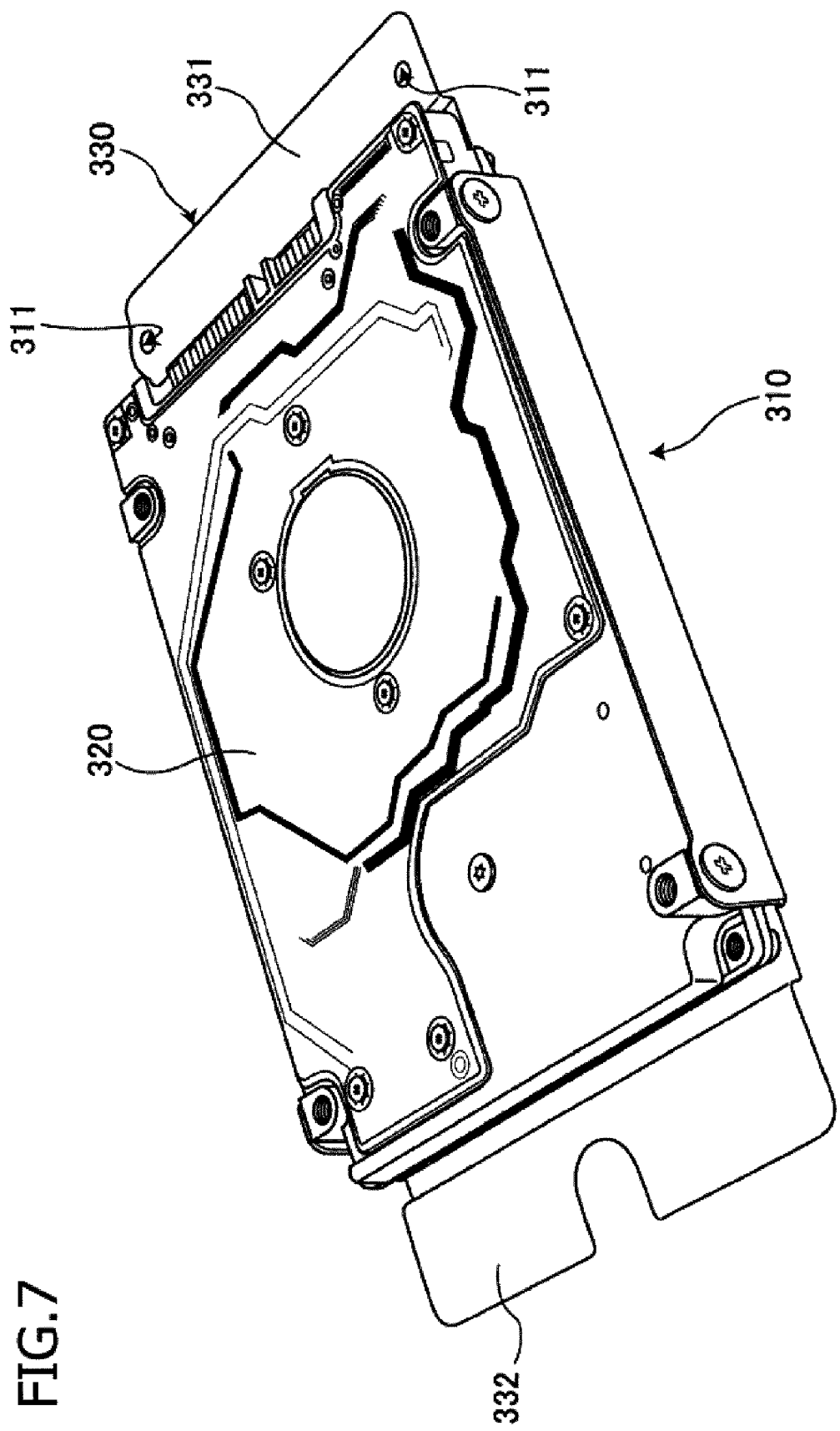
FIG. 7 depicts a hard disk drive.

FIG. 6 depicts a state where the hard disk drive unit 310 is removed from the disk storage opening 241 illustrated in FIG. 5. FIG. 7 depicts the hard disk drive unit 310.

As depicted in FIG. 6, when the hard disk drive unit 310 is not mounted, a portion of a circuit board 400 is exposed from the disk storage opening 241 of the main housing 21. As described above, the hard disk drive unit 310 includes the hard disk drive 320 and the mounting member 330. As depicted in FIG. 7, the mounting member 330 is attached to the hard disk drive 320 by a screw penetrating through a hole, provided in the side surface of the mounting member 330, to be fastened into a threaded hole provided in the side surface of the hard disk drive 320. The mounting member 330 includes plates 331 and 332 at the both ends in the longitudinal direction of the hard disk drive 320. The plate 331 includes a plurality of holes 311. The main housing 21 includes threaded holes 411 in positions corresponding to the plurality of holes 311 of the plate 331. The screws 312 depicted in FIG. 5 penetrate the holes 311 of the mounting member 330 to be fastened into the threaded holes 411 of the main housing 21, whereby the hard disk drive unit 310 is fixed to the main housing 21. The circuit board 400 is an example of the circuit board. The threaded hole 411 of the main housing 21 is an example of the fastening hole.

The main housing 21 further includes a rib 412 provided by extending an edge of the disk storage opening 241 toward the circuit board 400.

Figure 10:
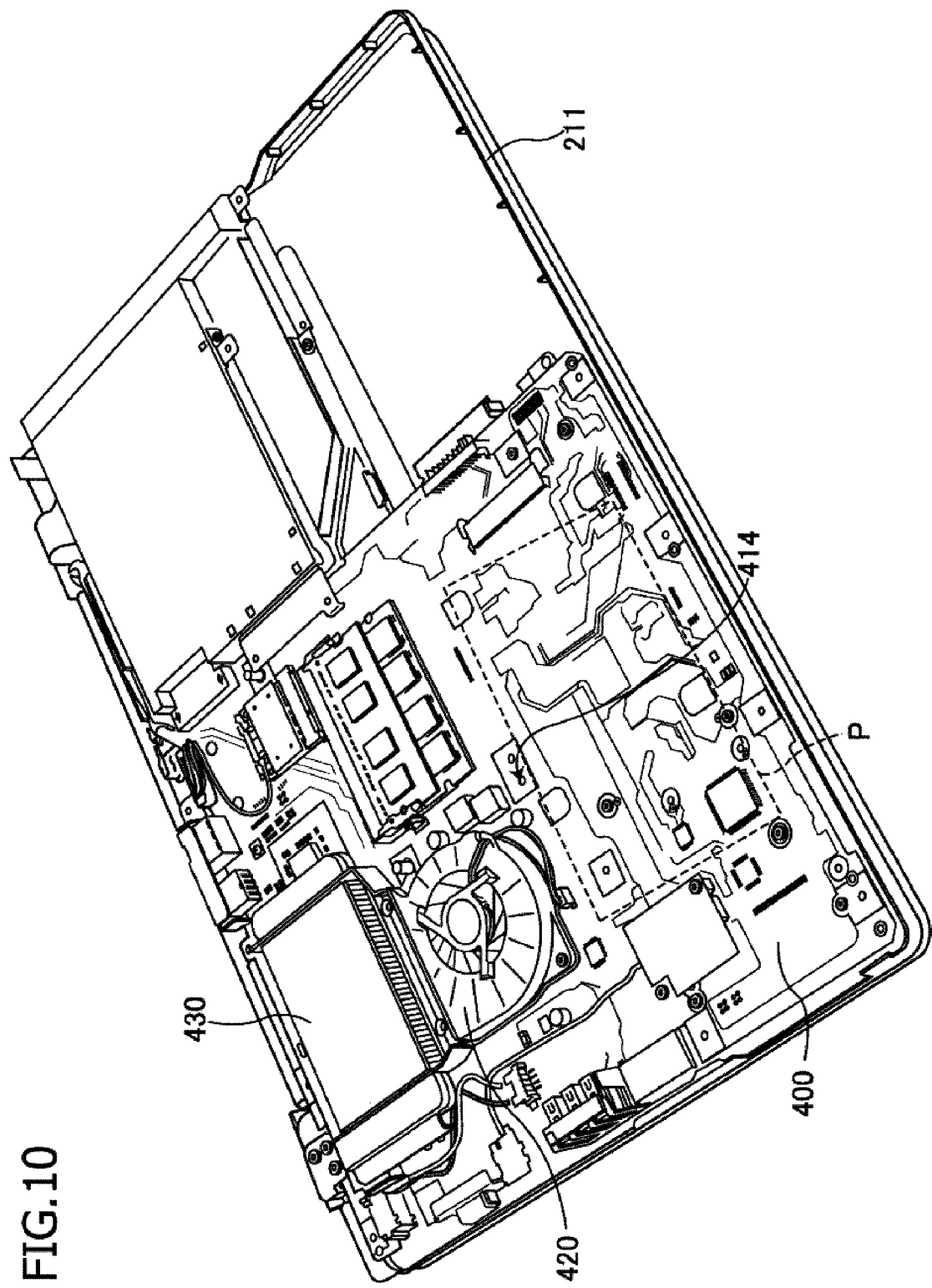
FIG. 10 depicts an upper housing with a lower cover removed.

Holes 413 provided in the lower cover 212 are used for attaching the lower cover 212 to the upper housing 211 by a screw penetrating through the hole 413 and a hole 414 of the circuit board 400 depicted in FIG. 10 to be fastened into a hole provided in the upper housing 211.

As described above, the plate 331, which is one end of the mounting member 330, is fixed to the main housing 21 by the screws 312, and the plate 332, which is the other end, is pressed by the disk cover 242 so as to be fixed to the main housing 21.

Figure 8:
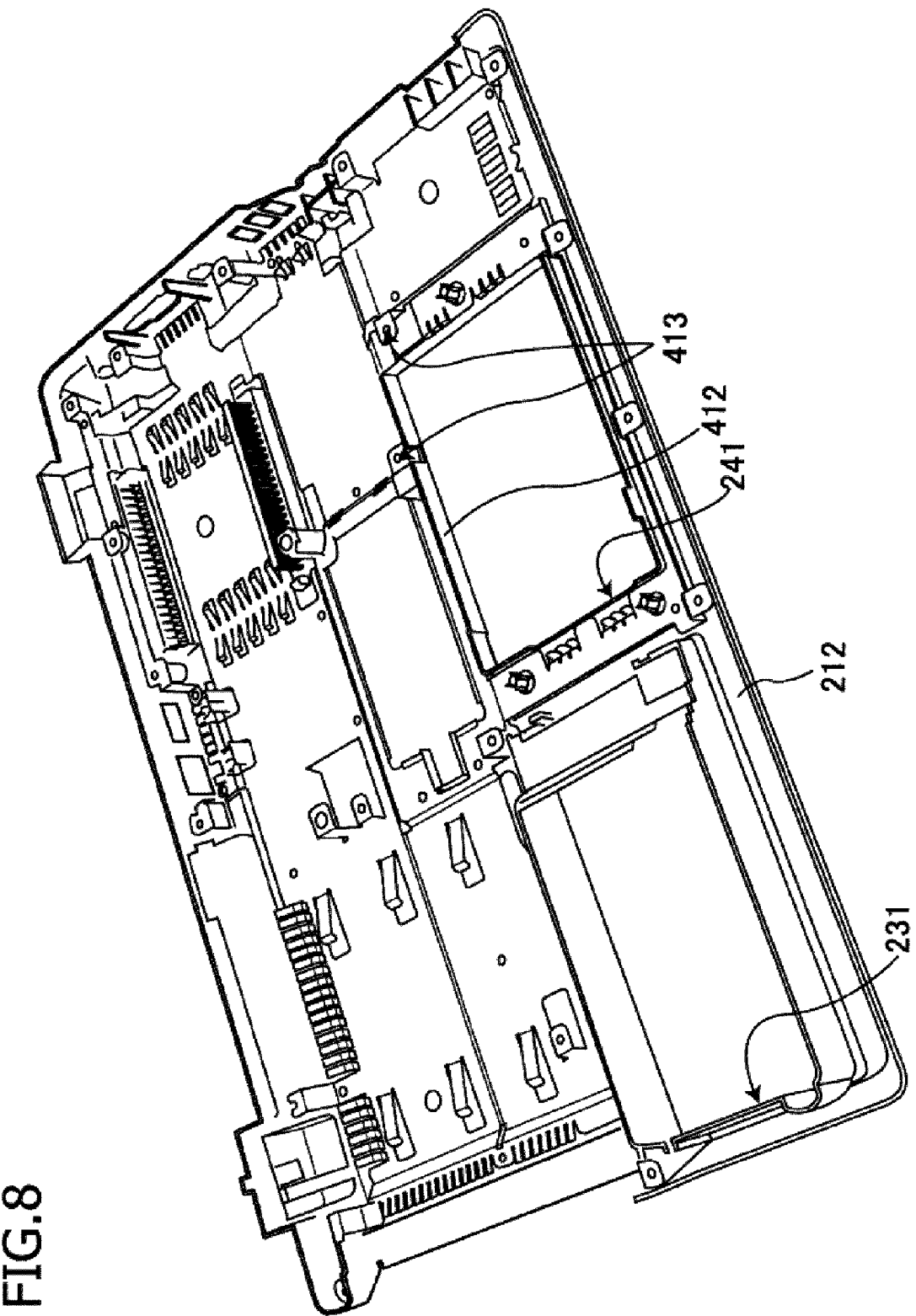
FIG. 8 depicts a rear side view of a lower cover.
Figure 9:
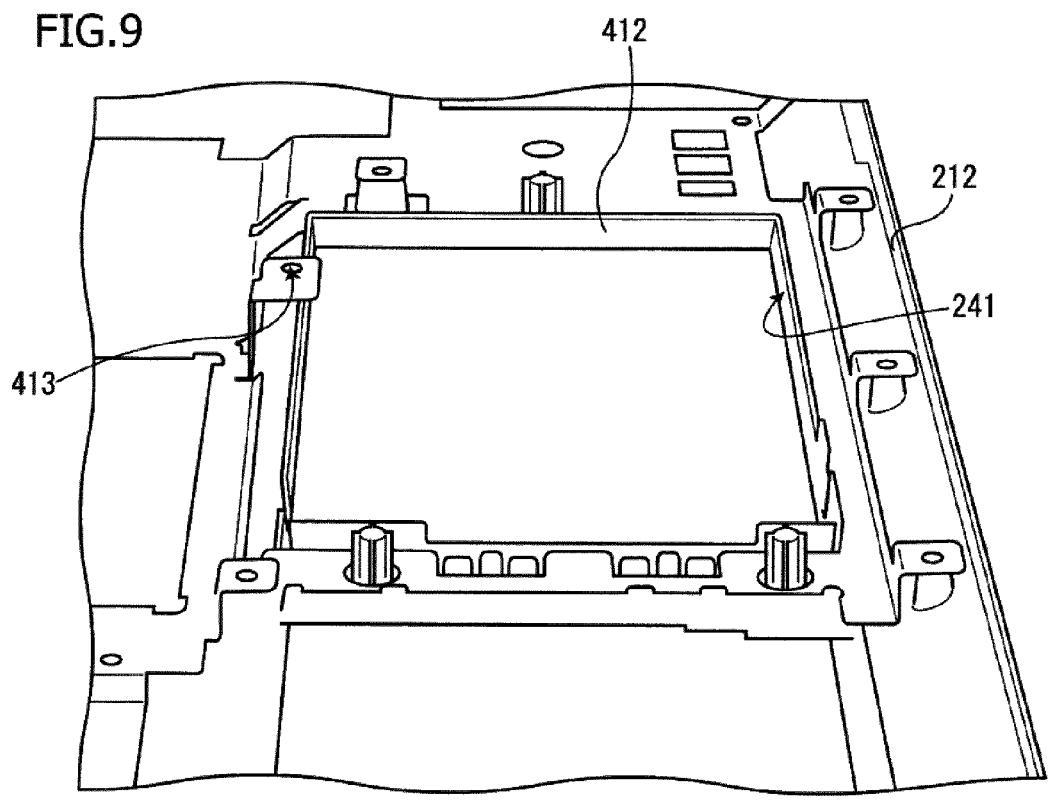
FIG. 9 is an enlarged view near a disk storage opening in a lower cover.

FIG. 8 depicts a rear surface side of the lower cover 212. FIG. 9 is an enlarged view near the disk storage opening 241 in the lower cover 212.

As illustrated in FIGS. 8 and 9, the rib 412 is formed on the lower cover 212 around the entire circumference of the disk storage opening 241. Since the rib 412 extends toward the circuit board 400, the space connecting the disk storage opening 241 to the inside of the main housing 21 is narrow. The rib 412 is an example of the rib.

FIG. 10 depicts the upper housing 211 with the lower cover 212 removed.

As illustrated in FIG. 10, the circuit board 400 is fitted into the upper housing 211. A heat radiating member 430 for radiating heat generated in various electronic components and a fan 420 for blowing air are disposed on the circuit board 400 next to a position P on the circuit board 400 mounted with the hard disk drive unit 310. Namely, the heat radiating member 430 and the fan 420 are disposed at a position where the rib 412 is located between them and the hard disk drive unit 310.

Figure 11:
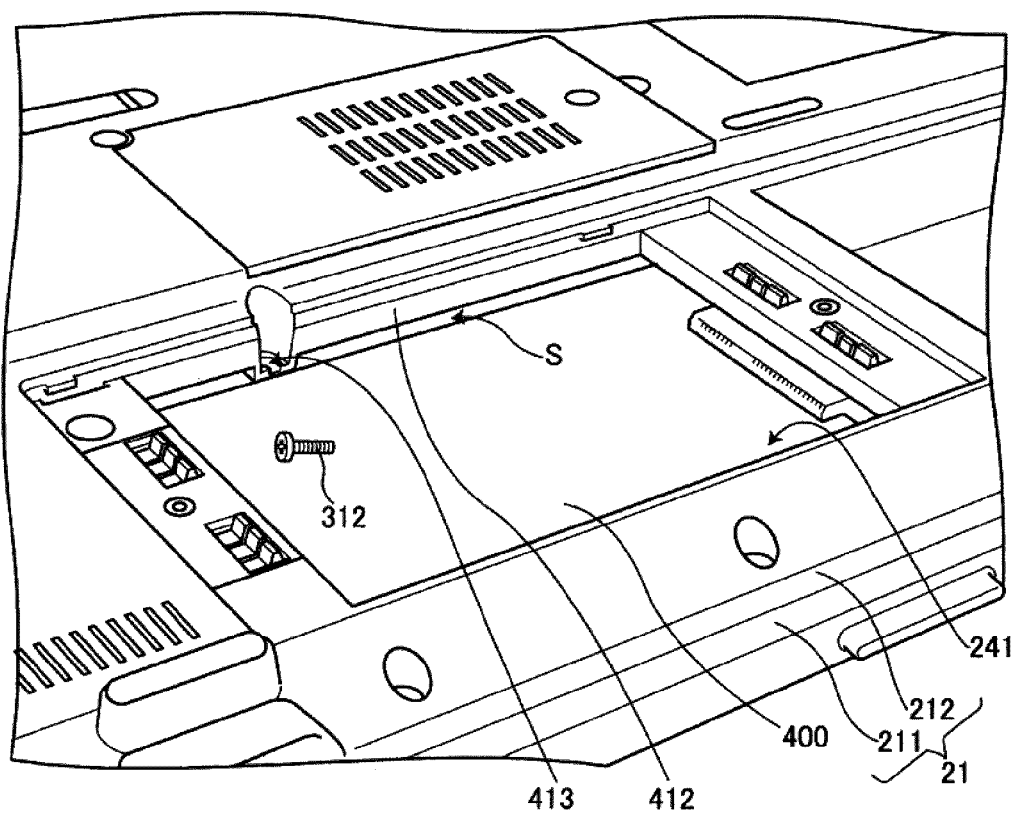
FIG. 11 is an enlarged view near a disk storage with a hard disk drive removed from a disk storage opening.

FIG. 11 is an enlarged view near the disk storage opening with the hard disk drive unit 310 removed from the disk storage opening 241 illustrated in FIG. 6.

As depicted in FIG. 11, the rib 412 extends from the edge of the disk storage opening 241 toward the circuit board 400. Even if the screw 312 falls into the disk storage opening 241, the rib 412 prevents the screw 312 from entering the main housing 21. According to this configuration, an operator can immediately find the screw 312 and remove the screw from the main housing 21.

In this embodiment, the electronic component is preferably a hard disk drive.

The hard disk drive 320 may be attached and detached after shipment of the personal computer 10. Therefore, the disk storage opening 241 is provided in the main housing 21, and the hard disk drive 320 is inserted into the disk storage opening 241 to be thereafter fastened by screws. Therefore, the screws 312 may easily fall into the disk storage opening 241 during the production or repair of the personal computer 10. However, in this embodiment, a path from the inside of the opening to the inside of the housing is closed or narrowed by the rib 412, and trouble caused by the screws 312 entering the main housing 21 may be reduced if not prevented, and thus the need to disassemble the main housing 21 in order to find the screws 312 is greatly reduced if not prevented.

It is preferable that a gap is provided between the circuit board and the rib. It is further preferable that a fan forming an air flow through the gap is provided at a position so that the rib is between the fan and the electronic component.

In this embodiment, as illustrated in FIG. 11, a gap S is provided between the rib 412 and the circuit board 400. The hard disk drive 320 usually generates more heat than other electronic components mounted in the personal computer 10. In this embodiment, air containing the heat generated in the hard disk drive 320 is guided through the gap S to the heat radiating member 430 by the fan 420 depicted in FIG. 10, and then is discharged outside the main housing 21. In this way, this embodiment achieves highly efficient radiation.

In this embodiment, the screws are used as an example of the fastening member; however, other kinds of fasteners such as a press-fit pin may be used.

The description of the configuration of the disk storage opening 241 ends here.

(Method for Mounting a Keyboard)

Subsequently, a method for mounting the keyboard 22 to the main housing 21 will be described.

The personal computer 10 includes:

a keyboard having a plurality of keys arranged on an upper surface and a rib, a long side of the keyboard extending in left and right directions, the rib protruding from the long side of the keyboard except at left and right ends;

a supporting portion to support a lower surface at the left and right ends of the keyboard; and a fixing portion to fix the rib of the keyboard, wherein the supporting portion supports the lower surface at the left and right ends of the keyboard so that the lower surface of the keyboard protrudes downward.

Figure 12:
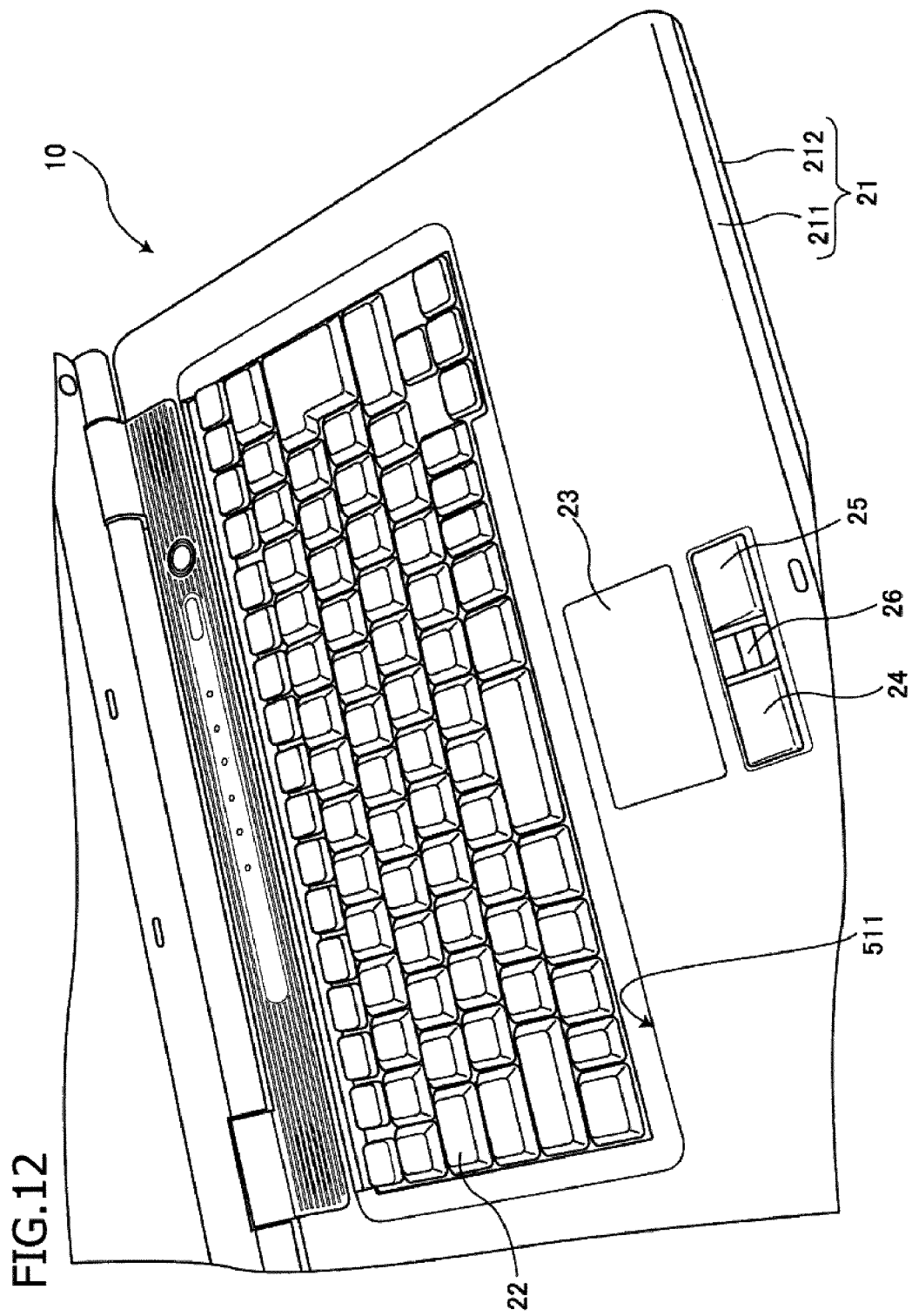
FIG. 12 is an enlarged view near a keyboard of a personal computer.

FIG. 12 is an enlarged view near the keyboard 22 of the personal computer 10.

The upper housing 211 of the main housing 21 includes an opening 511 on the upper surface. The keyboard 22 is mounted in the opening 511. The keyboard 22 is an example of the keyboard.

Figure 13:
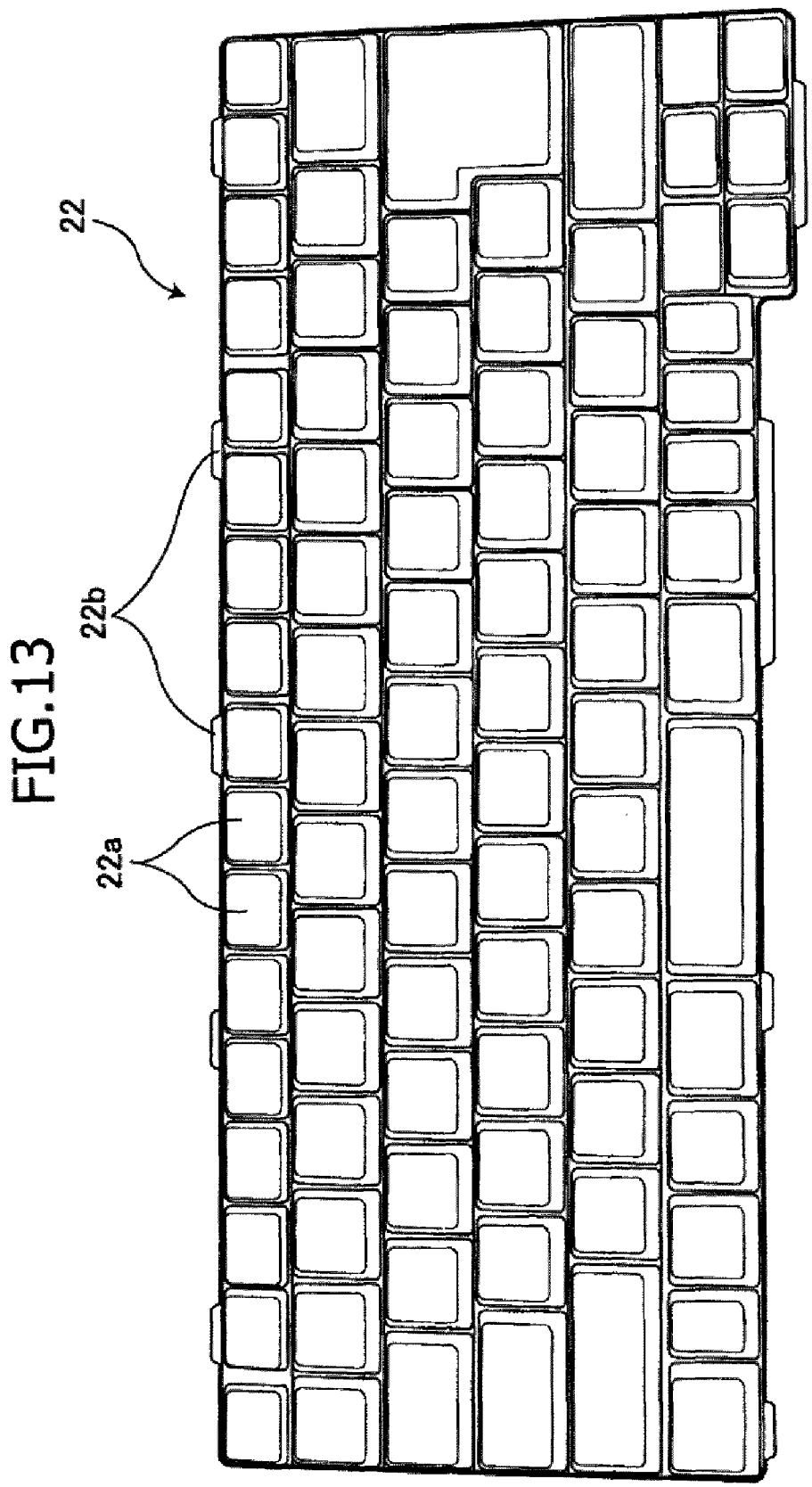
FIG. 13 depicts the keyboard removed from a personal computer.
Figure 14:
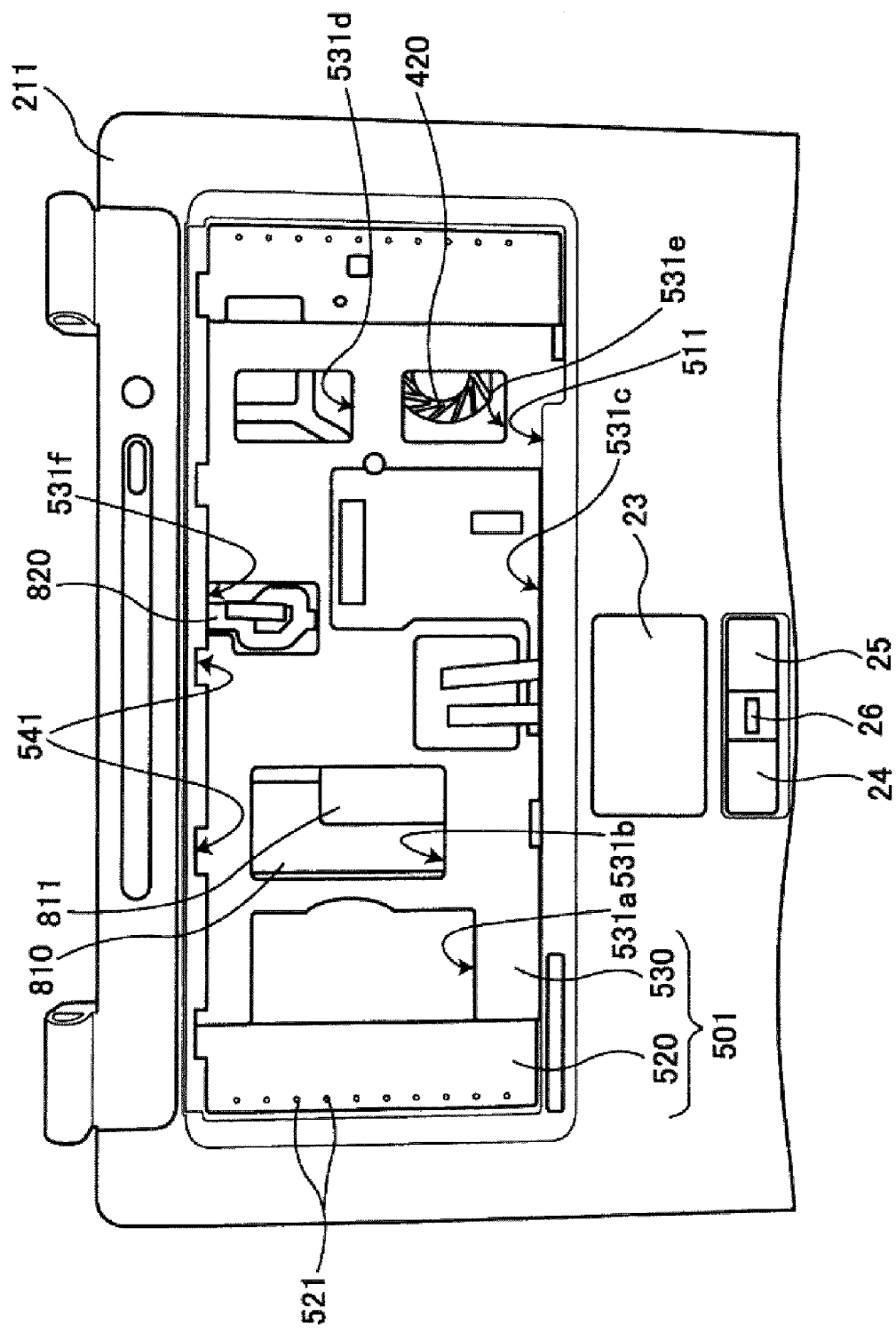
FIG. 14 depicts a main unit when the keyboard is removed.

FIG. 13 depicts the keyboard 22 removed from the personal computer 10. FIG. 14 depicts the main unit 20 with the keyboard 22 removed from the personal computer 10.

The keyboard 22 is formed of a generally soft flexible resin. The keyboard 22 includes a sheet and a plurality of keys 22a disposed on the sheet in a predetermined arrangement. The keyboard 22 further includes a thin metal plate on the lowermost surface of the keyboard for reinforcement. The keyboard 22 further includes a plurality of ribs 22b in a central portion other than the left and right ends on the circumferential edges of the front and back sides of the keyboard 22. The ribs 22b are used for mounting the keyboard 22 to the upper housing 211 of the main unit 20. The rib 22b is an example of the rib.

As depicted in FIG. 14, the upper housing 211 includes an opening 511 on the upper surface. A mounting plate 501 for fixing the keyboard 22 is fixed into the opening 511. The mounting plate 501 includes rib holes 541. The ribs 22b of the keyboard 22 are fixed into the rib holes 541. The mounting plate 501 further includes a plastic bulkhead portion 530 and a metal supporting portion 520. The bulkhead portion 530 partitions various electronic components and the keyboard 22. The supporting portion 520 is detachably attached to the left and right ends of the bulkhead portion 530. The rib holes 541 are an example of the fixing portion. The supporting portion 520 is an example of the supporting portion.

The supporting portion is preferably a metal material. The support portion further preferably includes a second supporting portion for supporting the lower surface of the keyboard in a area closer to the center than the left and right ends supported by the supporting portion.

In this embodiment, the central portion of the mounting plate 501 is made up of the plastic bulkhead portion 530 so that the personal computer 10 is reduced in weight. Further, in this embodiment, the left and right ends of the mounting plate 501 are made up of the metal supporting portion 520 so that the supporting strength of the keyboard 22 is enhanced, and when the keys are pressed, a good clicking feeling is realized. The bulkhead portion 530 is an example of the second supporting portion.

The configurations of the upper housing 211 and the supporting portion 520 will be described in detail.

Figure 15:
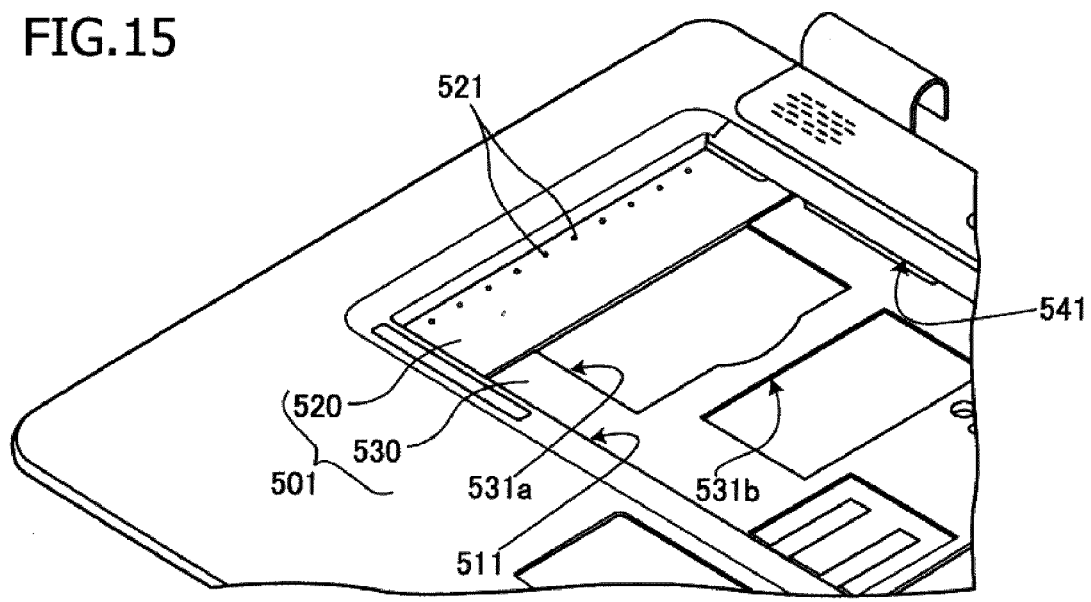
FIG. 15 is an enlarged view near a supporting portion of an upper housing.

FIG. 15 is an enlarged view near the supporting portion 520 of the upper housing 211.

The bulkhead portion 530 includes the rib holes 541 into which the ribs 22b of the keyboard 22 are fixed. The bulkhead portion 530 further includes a plurality of openings 531a and 531b. The supporting portion 520 further includes a plurality of protrusions 521 projecting upward and provided at a portion closer to the end of the upper housing 211 than the endmost rib hole 541 in the arrangement direction.

Figure 16:
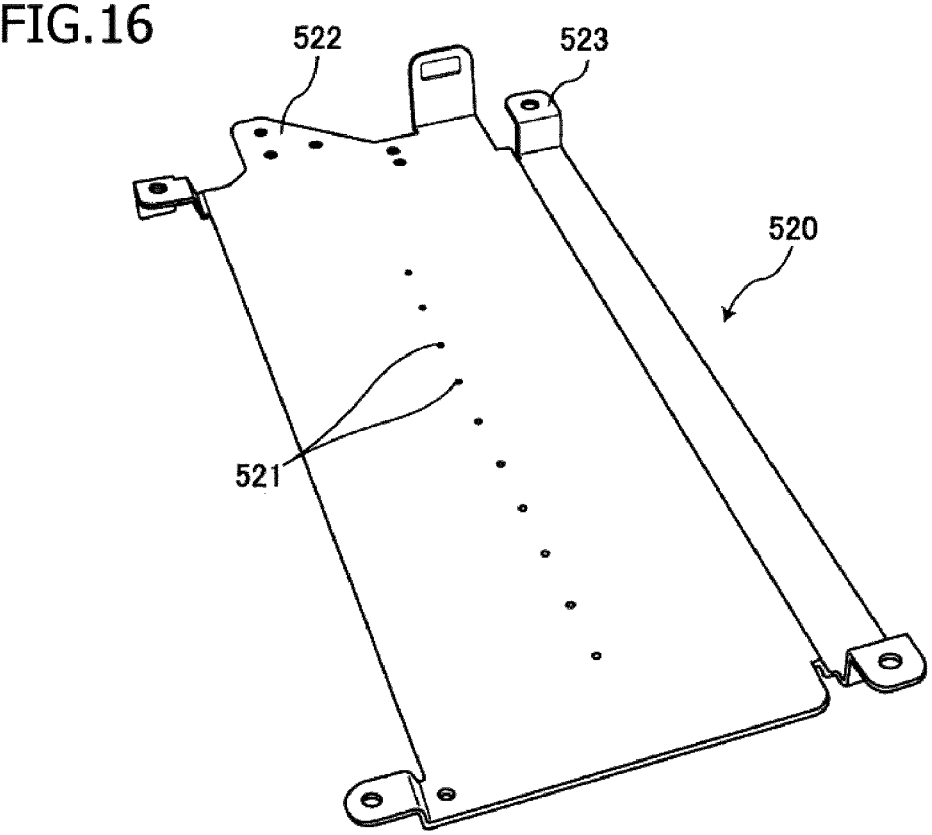
FIG. 16 depicts a supporting portion.
Figure 17:
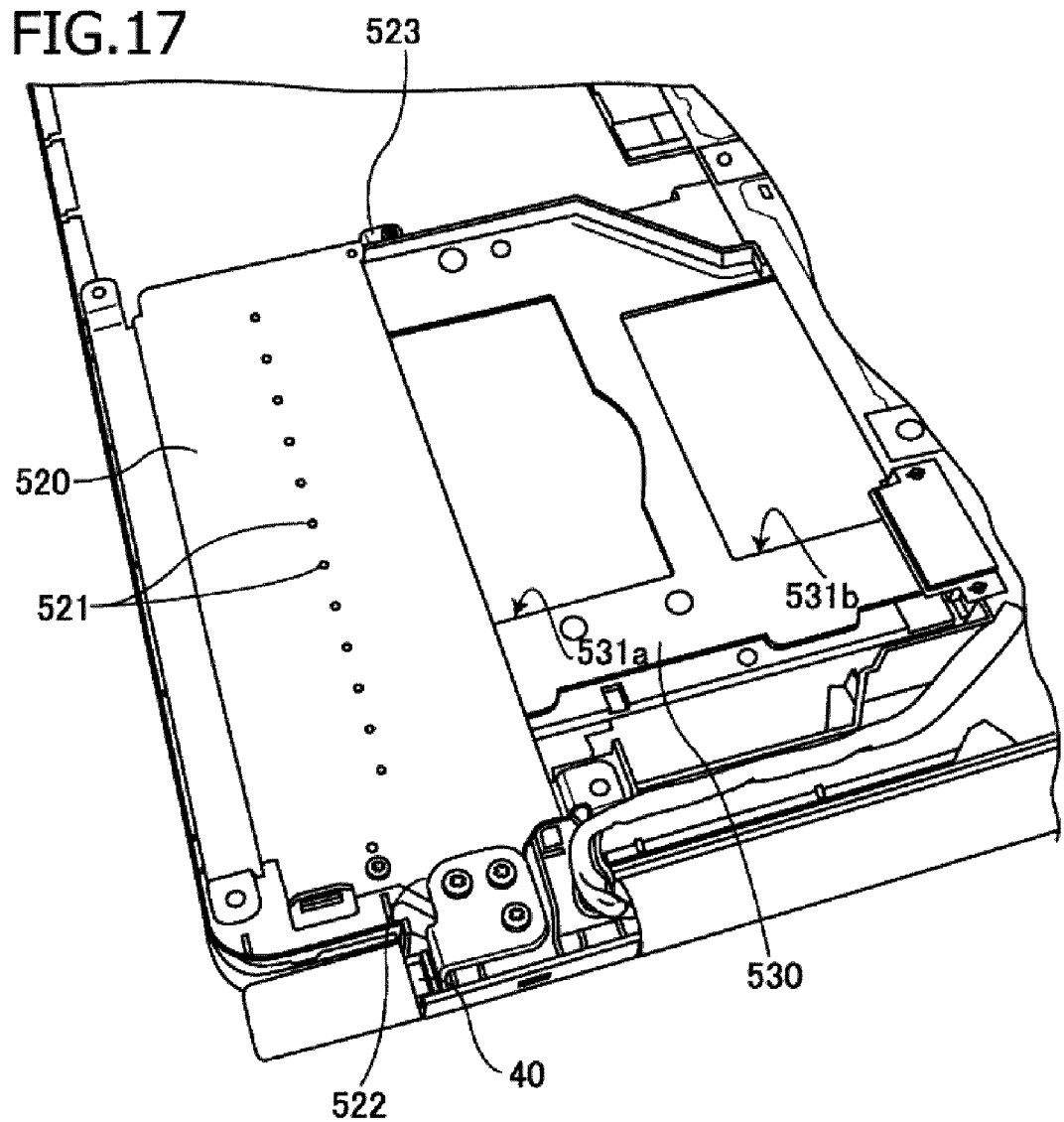
FIG. 17 depicts a rear surface of an upper housing with the supporting portion attached.

FIG. 16 depicts the supporting portion 520. FIG. 17 depicts a rear surface side of the upper housing with the supporting portion 520 attached.

The supporting portion 520 includes a housing fixing portion 523 and a hinge fixing portion 522. The housing fixing portion 523 is fixed to the upper housing 211. The hinge fixing portion 522 is fixed to the hinge 40. As depicted in FIG. 17, the hinge fixing portion 522 of the supporting portion 520 is connected to the hinge 40 and extends in a direction away from the hinge 40. In this embodiment, the metal supporting portion 520 and the hinge 40 are connected to each other so that other metal components for fixing the hinge 40 and the upper housing 211 are not required to be provided, and the fixing strength of the hinge 40 is enhanced while reducing the number of components.

FIG. 14 will be described again.

As depicted in FIG. 14, the mounting plate 501 has such a structure that the metal supporting portion 520 is attached to the left and right sides of the light and soft bulkhead portion 530. Further, in the mounting plate 501, an optical disc drive 810, a holding member 811 for the optical disc drive 810, the circuit board 400, a connector stiffening member 820, and the fan 420 are partially visible from a plurality of openings 531a, 531b, 531c, 531d, 531e, and 531f provided in the bulkhead portion 530.

FIG. 18 is a conceptual diagram depicting the keyboard 22 mounted on the mounting plate 501.

Figure 18A:
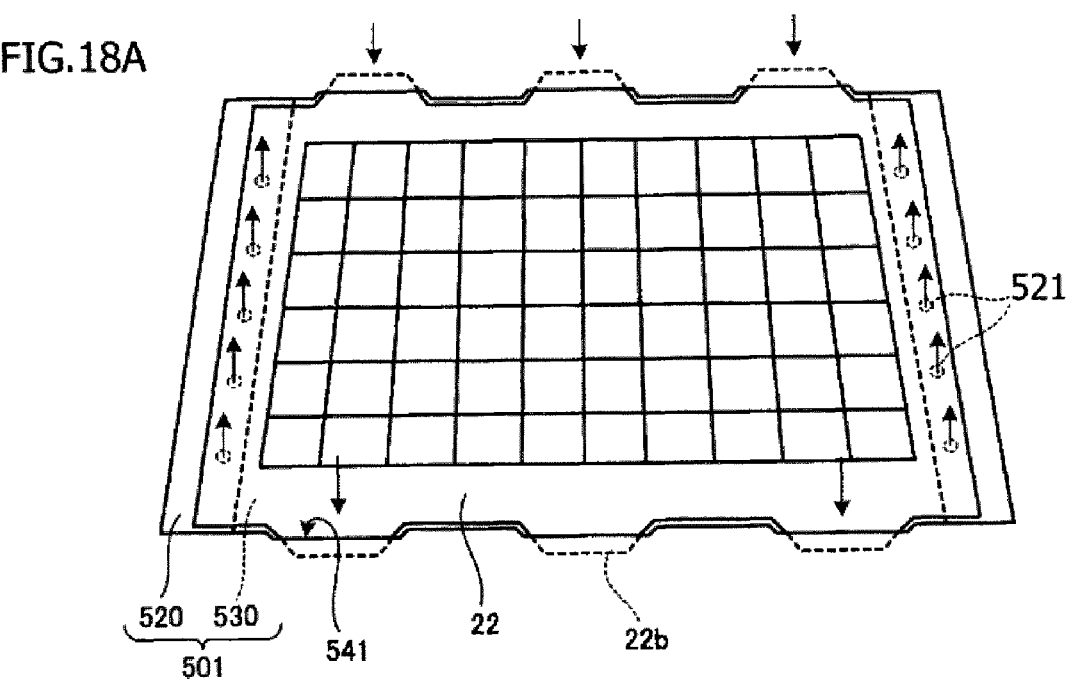
FIG. 18 is a conceptual diagram depicting a keyboard mounted on a mounting plate.

FIG. 18A is an upper view of the mounting plate 501 and the keyboard 22. As depicted in FIG. 18A, the ribs 22b of the keyboard 22 are inserted into the rib holes 541 of the bulkhead portion 530 so that the keyboard 22 is mounted on the mounting plate 501. The keyboard 22 has elasticity. According to this configuration, the ribs 22b are fixed to the rib holes 541, and the left and right ends of the keyboard 22 are pressed upward by the protrusions 521 of the supporting portion 520 so that the central portion of the keyboard 22 is pressed downward against the mounting plate 501. In this embodiment, the central portion of the keyboard 22 is pressed against the mounting plate 501 by utilizing the elasticity of the keyboard 22 to suppress floating of the keyboard 22. According to this configuration, this embodiment prevents the sinking of the key when the keyboard is pressed and provides good key operability for a long period of time.

It is preferable that the supporting portion has, on its upper surface, a plurality of protrusions aligned in the short side direction of the keyboard, and that the keyboard is supported with the lower surfaces of the left and right ends of the keyboard raised by the protrusions.

The protrusions 521 press up both ends of the keyboard 22 to thereby increase the contact between the keyboard 22 and the metal supporting portion 520, whereby the keyboard 22 is reliably electrically connected.

Here, there will be described another method for pressing up the left and right ends of the keyboard 22 and supporting the keyboard so that the lower surface of the keyboard is protruding downward.

Figure 18B:
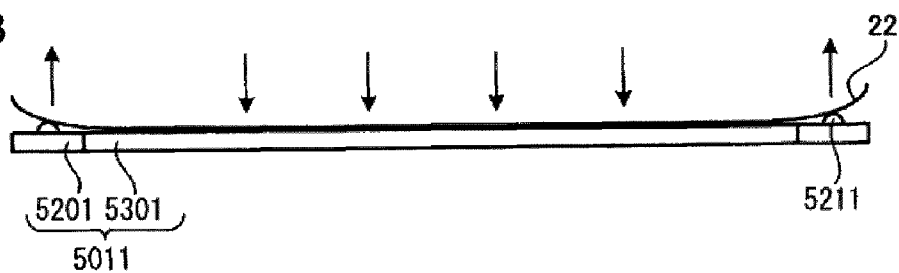
Figure 18C:
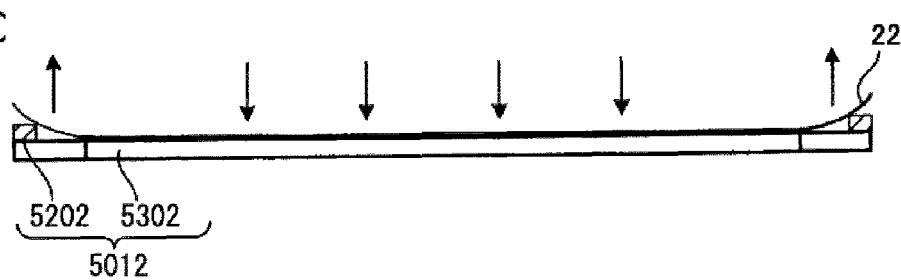
Figure 18D:
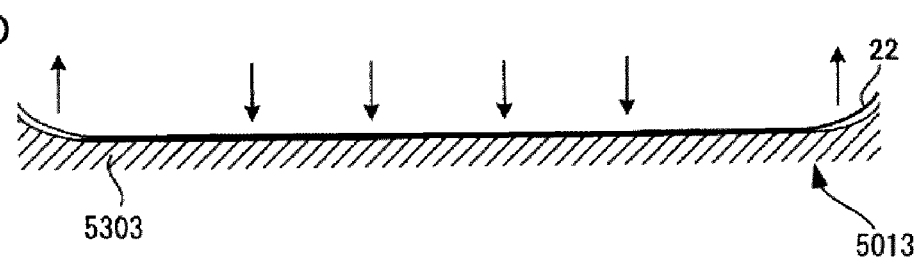

FIGS. 18B, 18C, and 18D are cross-sectional views of a mounting plate and a keyboard different from those of FIG. 18A.

The supporting portion has on its upper surface a rib extending in the short side direction of the keyboard, and the keyboard may be supported so that the lower surfaces of the left and right ends of the keyboard are lifted by the rib.

In FIG. 18B, instead of the protrusions 521, a rib 5211 extending in a depth direction (short side direction of the keyboard 22) is provided on a supporting portion 5201. The rib 5211 lifts the left and right ends of the keyboard 22. The rib 5211 extending in the depth direction is formed in the supporting portion 5201 so that the left and right ends of the keyboard 22 may be reliably pushed upward.

FIG. 18C depicts a mounting plate 5012 in which a metal supporting portion 5202 is placed on a plastic bulkhead portion 5302. Although protrusions are not provided in the supporting portion 5202, the supporting portion 5202 has a step with respect to the bulkhead portion 5302. The step presses up the left and right ends of the keyboard 22. The mounting plate 5012 has a step at portions facing the left and right ends of the keyboard 22 to thereby prevent the deflection of the keyboard 22.

It is also preferable that the supporting portion has on its upper surface slopes that slope upward from the central portion of the keyboard toward the left and right ends, and that the keyboard is supported so that the lower surfaces of the left and right ends of the keyboard are pushed upward by the slopes.

In FIG. 18D, the mounting plate 5013 is made up of only the plastic bulkhead portion 5303, and the bulkhead portion 5303 has slopes that slope upward formed from the central portion of the keyboard 22 toward the left and right ends. The slope of the bulkhead portion 5303 may push the left and right ends of the keyboard 22 upward.

The description of the method for mounting the keyboard ends here.

(Connector Stiffening Member)

Subsequently, the connector stiffening member 820 also depicted in FIG. 14 will be described.

The personal computer 10 includes:

a circuit board including a connector mounted at an end edge and a metal member reinforcing the connector, the connector including a fitting surface of the connector facing outside;

a housing which accommodates the circuit board and includes a first opening for a keyboard arrangement formed in an upper surface thereof and a second opening for fitting with a mating connector formed on a side surface thereof, the second opening facing the fitting surface of the connector mounted on the circuit board; and a keyboard exposed to the outside from the first opening and having a plurality of keys arranged on an upper surface thereof.

The metal member extends under the keyboard and supports a portion of the lower surface of the keyboard.

Figure 19:
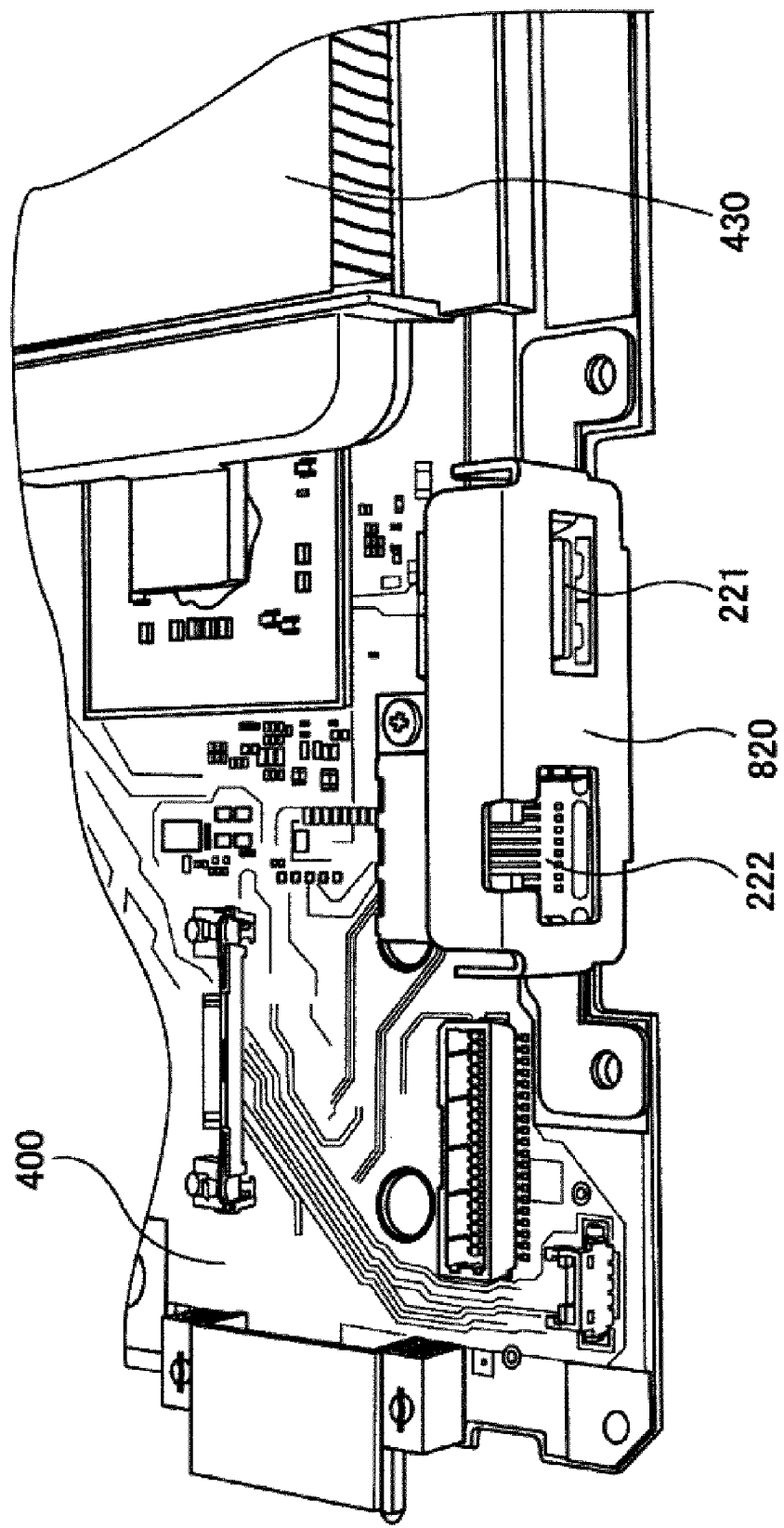
FIG. 19 depicts a first surface (lower surface) of a circuit board mounted with connectors.

FIG. 19 depicts a first surface (lower surface) of the circuit board 400 mounted with connectors 221 and 222.

The connectors 221 and 222 are mounted on the first surface (lower surface) side of the circuit board 400 so that the fitting surfaces of the connectors face outward. The connector stiffening member 820 for preventing trouble due to static electricity and reinforcing the connectors 221 and 222 is attached to the connectors 221 and 222. The connectors 221 and 222 are fitted into the connector openings 221a and 222a for the connector fitting depicted in FIG. 3. The connectors 221 and 222 are examples of the connectors. The connector stiffening member 820 is an example of the metal member. The connector openings 221a and 222a for connector fitting are examples of the second opening. The opening 511 for the arrangement of the keyboard 22 depicted in FIG. 14 is an example of the first opening.

Figure 20:
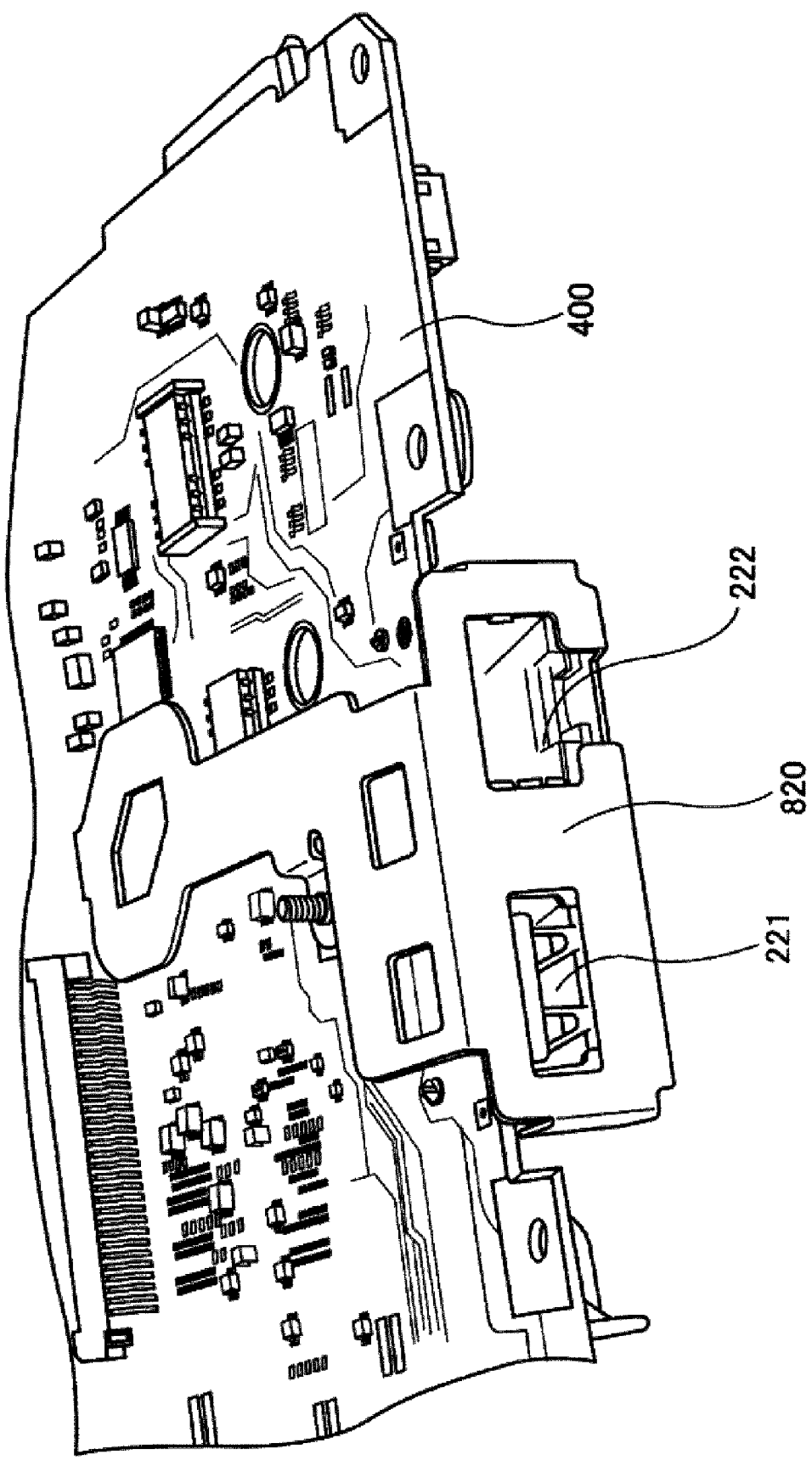
FIG. 20 depicts a second surface (upper surface) of a circuit board.

FIG. 20 depicts a second surface (upper surface) of the circuit board 400 depicted in FIG. 19.

As depicted in FIG. 20, the connector stiffening member 820 wraps around the first surface (lower surface) side of the circuit board 400 and extends to the second surface (upper surface). The circuit board 400 is mounted into the main housing 21 so that the second surface faces upward. Consequently, as depicted in FIG. 14, the circuit board 400 is disposed at a position facing the lower surface of the keyboard 22, and a portion of the connector stiffening member 820 is exposed from an opening 531f provided in the mounting plate 501.

As a preferred embodiment, the connector is mounted on a first surface of the circuit board facing the bottom surface side of the housing, and the metal member includes a first portion reinforcing the connector on the first surface side and a second portion which wraps around and extends from the first surface side to the second surface side of the circuit board and supports the keyboard.

It is also preferable to provide an opening from which the metal member facing the lower surface of the keyboard is partially exposed, and to provide a mounting member which supports the keyboard in cooperation with the metal member with the lower surface of the keyboard placed on the mounting member.

When the keyboard 22 is mounted on the mounting plate as depicted in FIG. 14, the connector stiffening member 820 exposed by the opening 531f is in contact with the lower surface of the keyboard 22. Thus, the connector stiffening member 820 for reinforcing the connectors 221 and 222 extends under the keyboard 22 to support the lower surface of the keyboard 22. Therefore, in this embodiment, the strength for supporting the keyboard 22 may be enhanced without increasing the number of components, and a good clicking feeling may be provided. Further, the metal connector stiffening member 820 is in contact with the keyboard 22, whereby the keyboard 22 is reliably electrically connected.

The description of the connector stiffening member ends here.

(Optical Disc Drive)

Subsequently, the optical disc drive 810 also depicted in FIG. 14 will be described.

Figure 21:
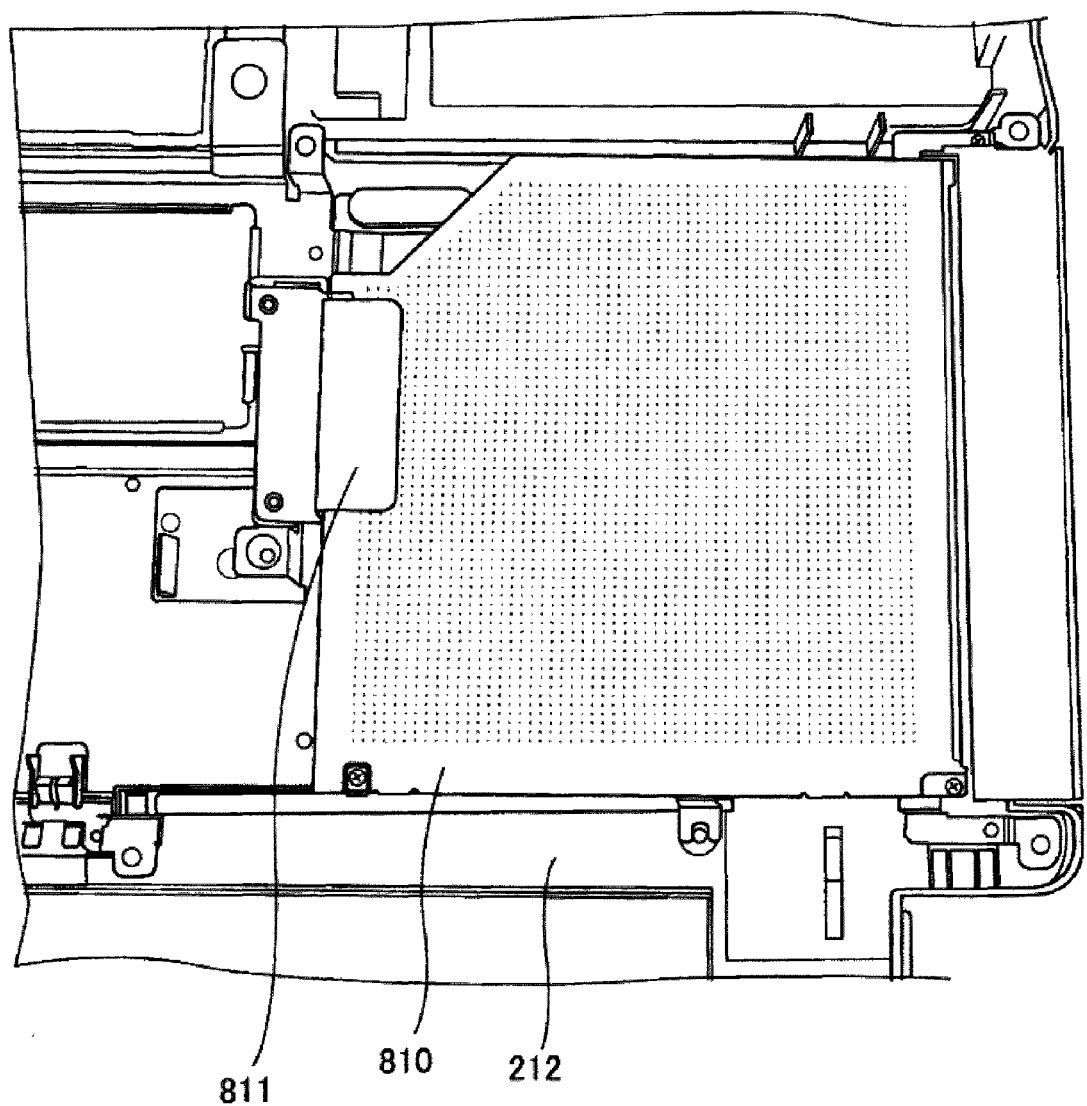
FIG. 21 depicts an optical disk drive accommodated in a main housing.

FIG. 21 depicts the optical disc drive 810 accommodated in the main housing 21.

The metal holding member 811 is attached to the optical disc drive 810. The holding member 811 is fixed to the lower cover 212 of the main housing 21 to be thereby mounted on the lower cover 212.

Figure 22:
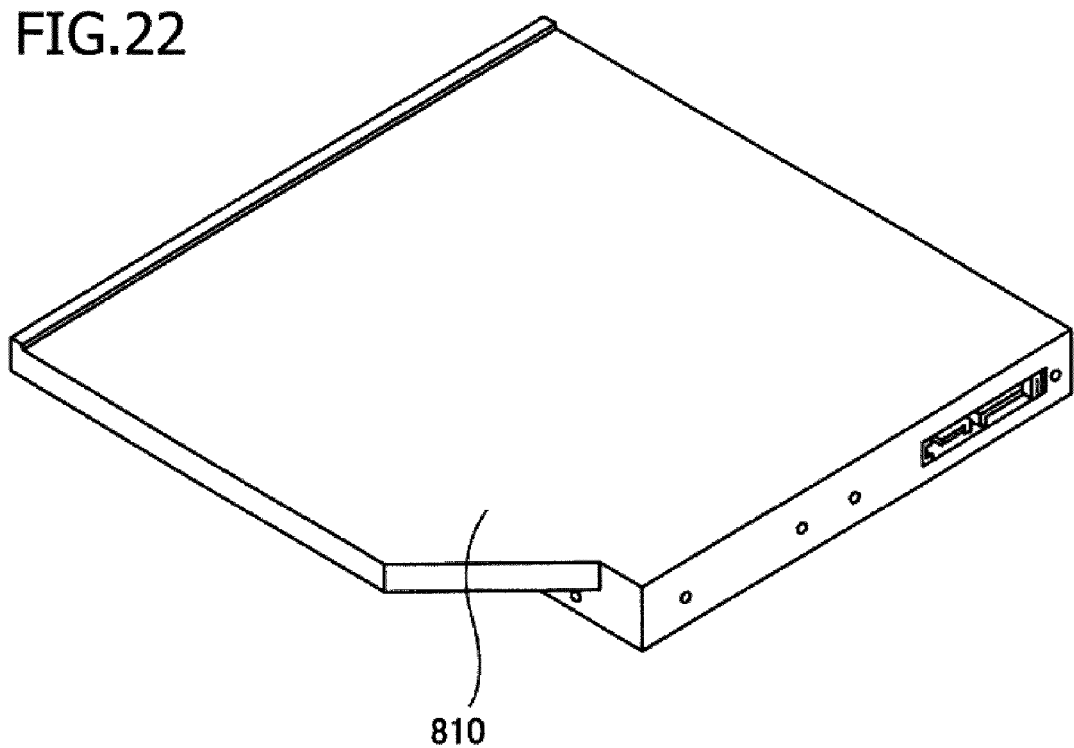
FIG. 22 depicts an optical disk drive.
Figure 23:
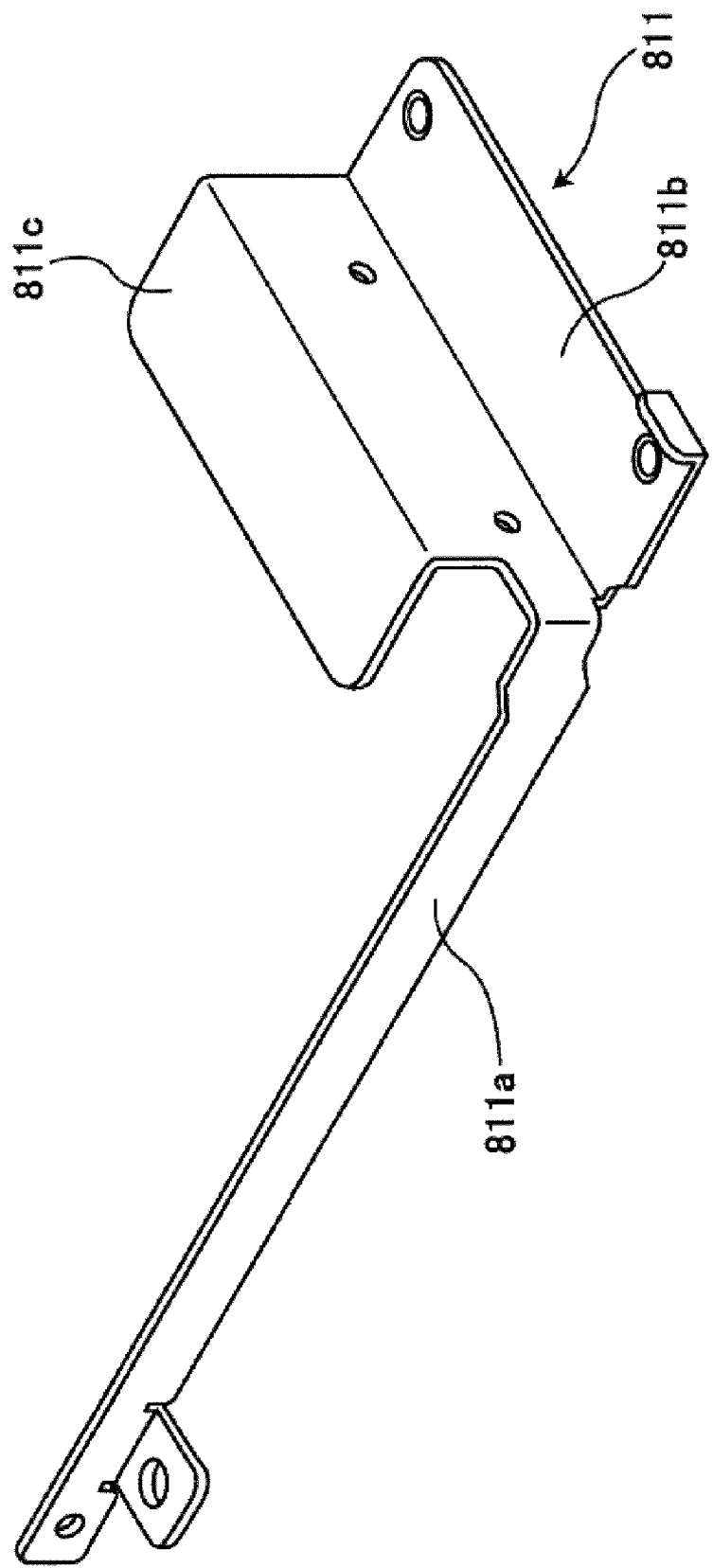
FIG. 23 depicts a holding member.
Figure 24:
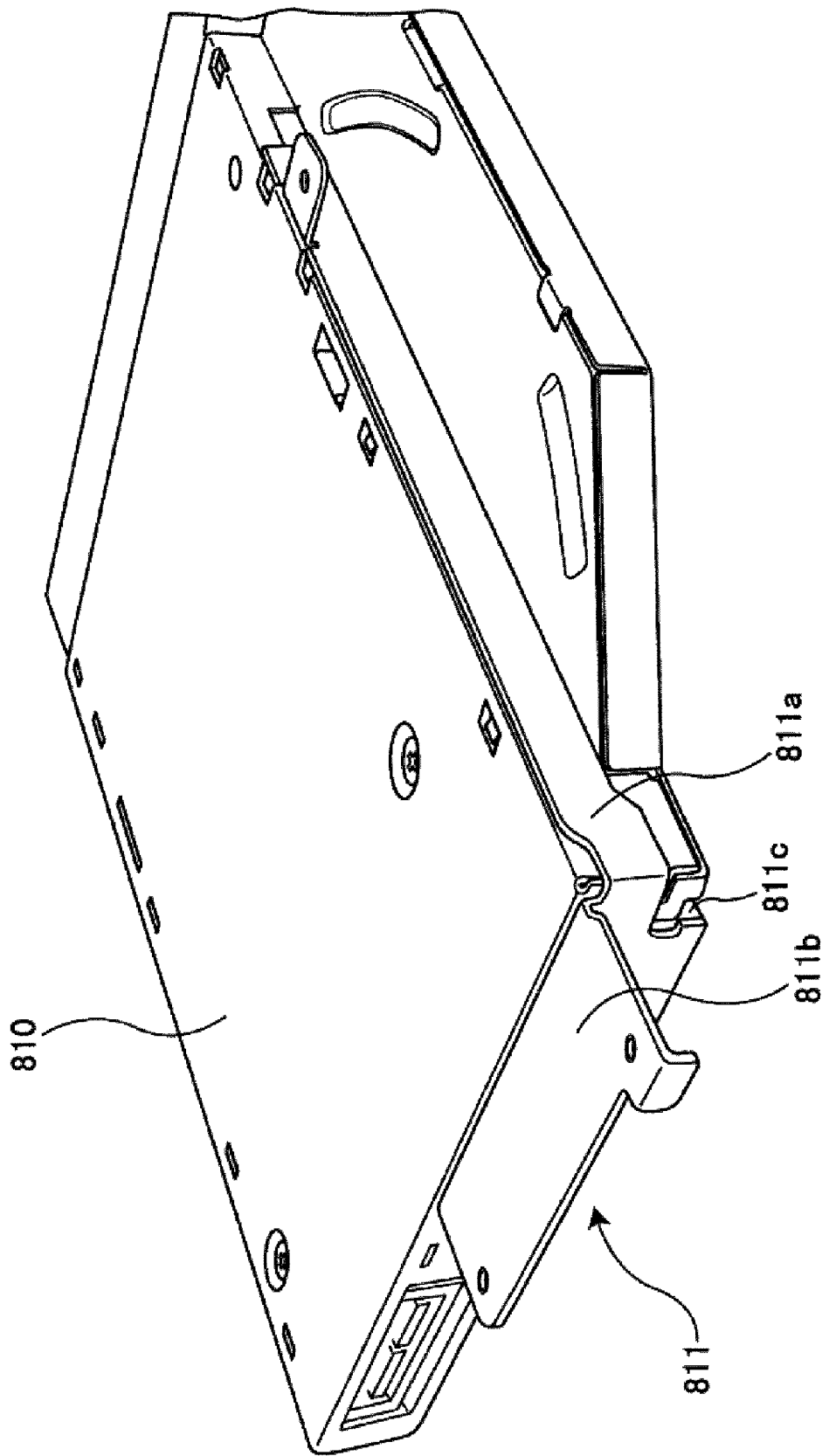
FIG. 24 depicts an optical disk drive mounted with a holding member.

FIG. 22 depicts the optical disc drive 810. FIG. 23 depicts the holding member 811. FIG. 24 depicts the optical disc drive 810 mounted with the holding member 811.

The optical disc drive 810 has a thin plate shape. The holding member 811 has a side portion 811a, an upper surface portion 811c, and a fixing portion 811b. The side portion 811a holds the side surface of the optical disc drive 810. The upper surface portion 811c holds the upper surface of the optical disc drive 810. The fixing portion 811b is fixed to the lower cover 212. When the holding member 811 is mounted on the optical disc drive 810, the upper surface portion 811c of the holding member 811 wraps around and extends onto the upper surface of the optical disc drive 810.

Figure 25:
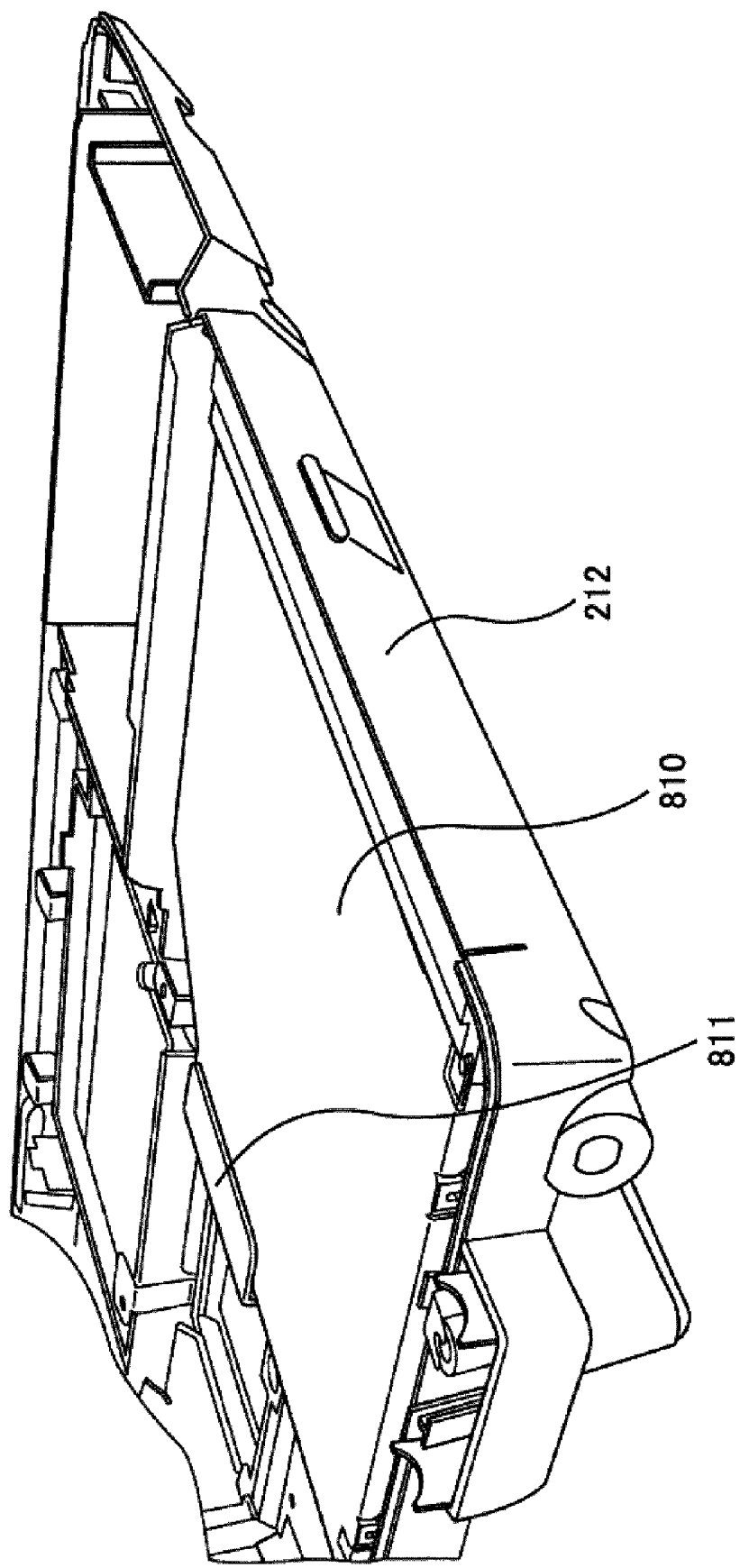
FIG. 25 is a view of an optical disk drive viewed from an oblique direction.

FIG. 25 is a view depicting the optical disc drive 810 depicted in FIG. 21 as viewed from the oblique direction.

When the optical disc drive 810 is mounted on the lower cover 212 of the main housing 21, the upper surface portion 811c of the holding member 811 is positioned higher than the upper surface of the optical disc drive 810. The upper housing 211 is mounted on the lower cover 212 as depicted in FIG. 25, and the keyboard 22 is mounted on the mounting plate 501. According to this configuration, as depicted in FIG. 14, the holding member 811 exposed by the opening 531b supports the lower surface of the keyboard 22, and therefore, the fixing strength of the keyboard 22 may be enhanced.

The description of the optical disc drive ends here.

(Expansion Card Slot)

Subsequently, the configuration of the expansion card slot 210 also depicted in FIG. 3 will be described.

The personal computer 10 includes:

a circuit board;

a housing accommodating the circuit board and having a card insertion slot on a side surface thereof; and a card holding portion fixed on the circuit board and having a card receiving slot facing the card insertion slot and provided closer to a center side of the circuit board than a side edge of the circuit board on the card insertion slot side.

The card holding portion receives a card, inserted through the card insertion slot, from the card receiving slot and holding the card.

The housing has a guiding rib which extends from the card insertion slot to the vicinity of the card receiving slot and guides the card, inserted into the card insertion slot, to the card receiving slot.

Figure 26:
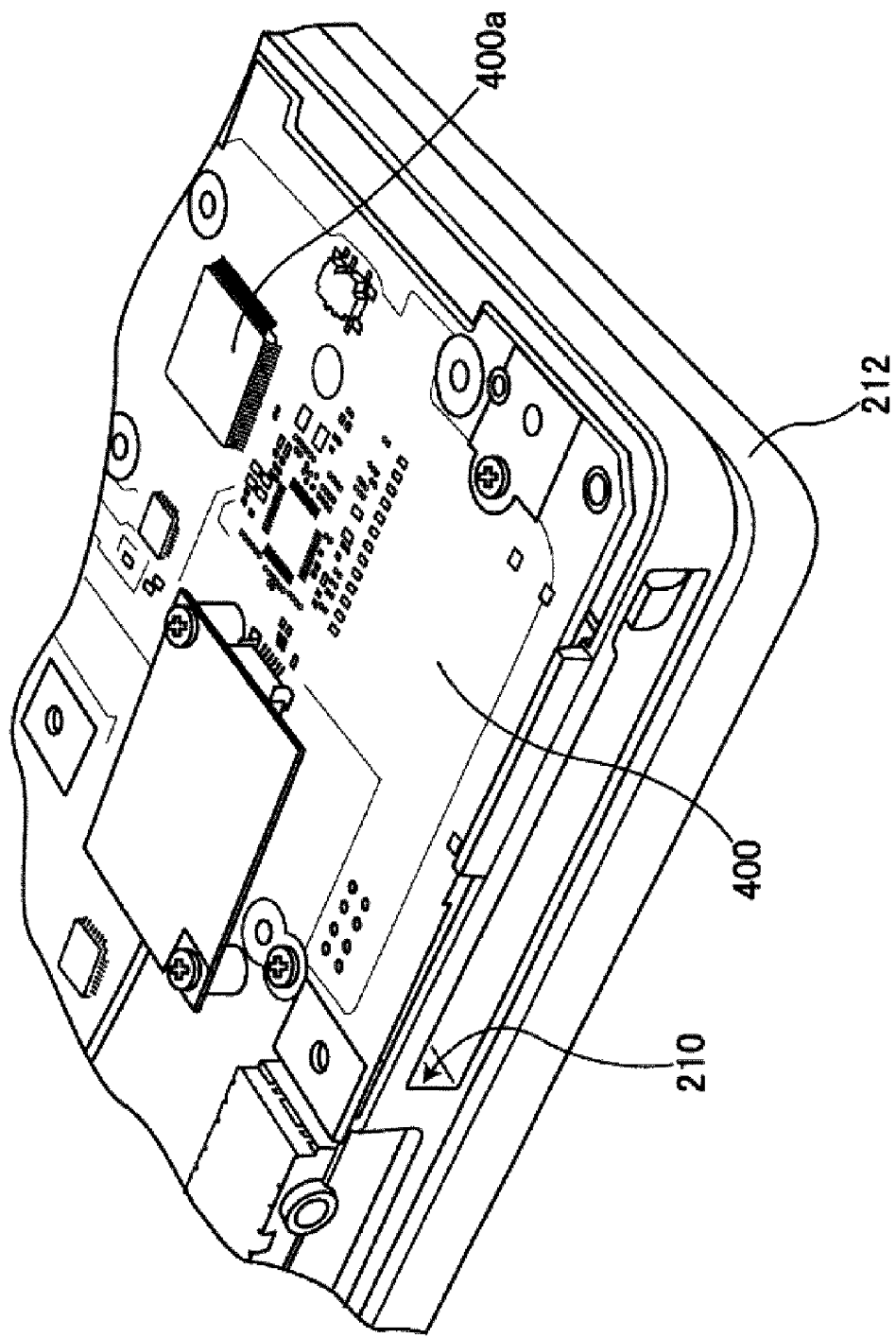
FIG. 26 depicts an area near an expansion card slot of an upper housing with a lower cover removed.

FIG. 26 depicts an area near the expansion card slot 210 of the upper housing 211 with the lower cover 212 detached.

The expansion card slot 210 is provided in the side surface of the upper housing 211. An expansion card is inserted through the expansion card slot 210 and mounted in parallel along the circuit board 400. The expansion card slot 210 is an example of the card insertion slot.

Figure 27:
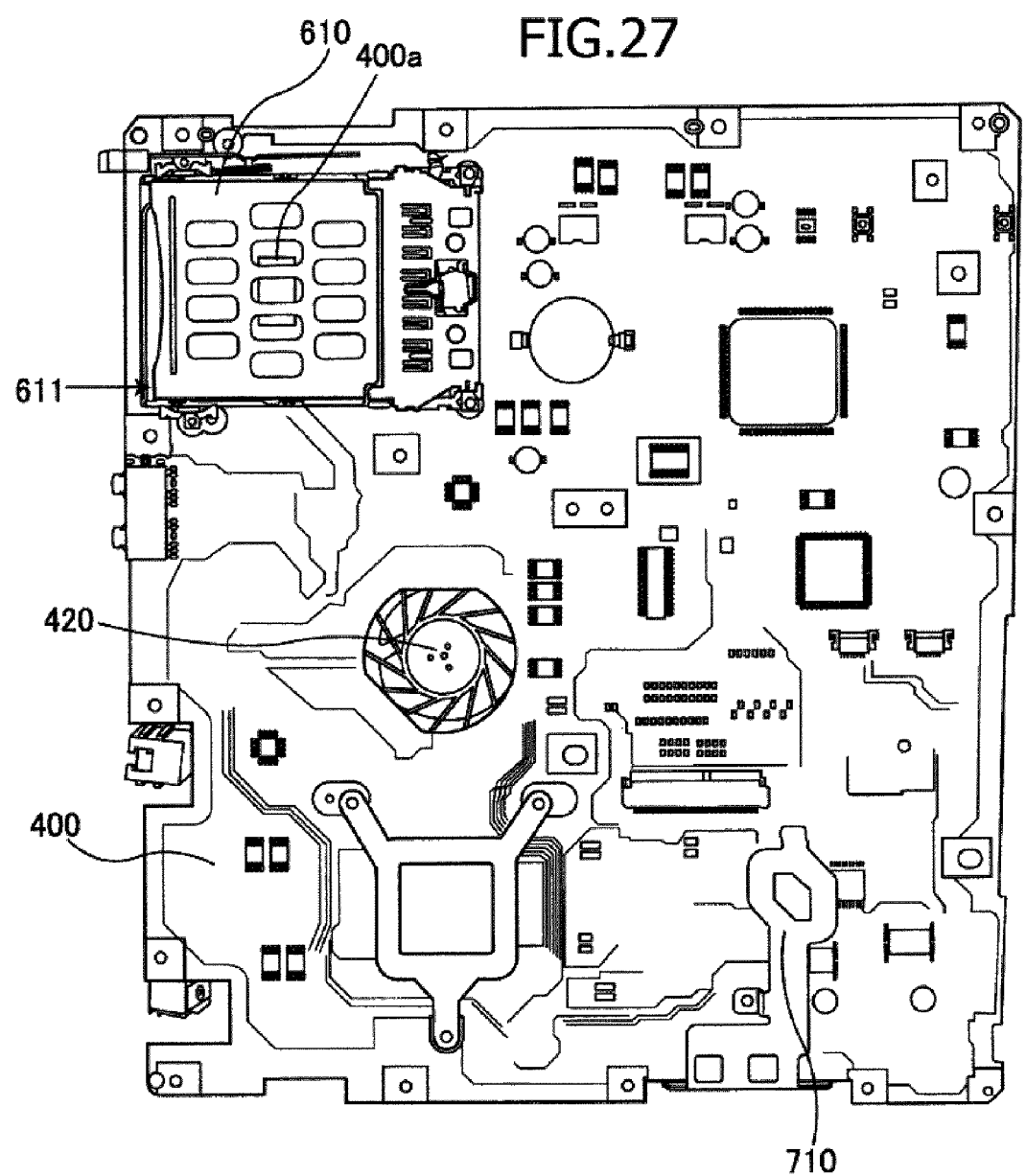
FIG. 27 depicts an upper surface of a circuit board with an expansion card holding member attached thereto.
Figure 28:
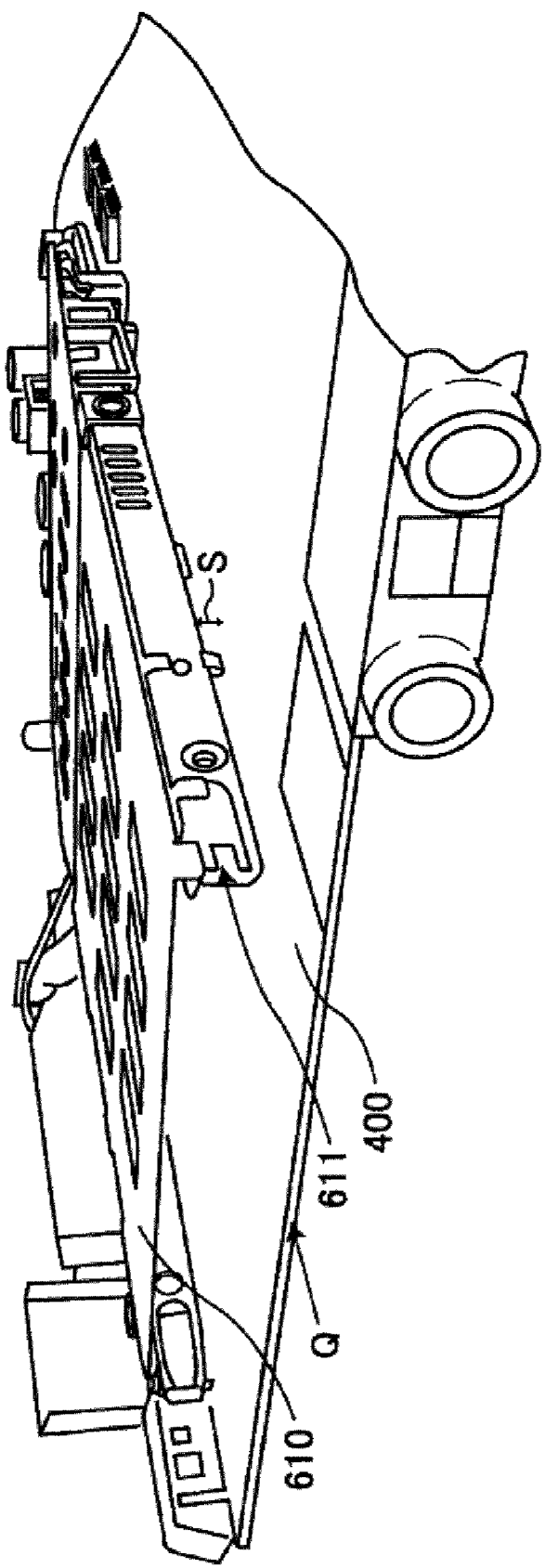
FIG. 28 is a view of an expansion card holding member viewed obliquely downward.

FIG. 27 depicts the upper surface of the circuit board 400 with an expansion card holding member. FIG. 28 is a view of the expansion card holding member viewed obliquely downward.

As depicted in FIG. 27, the expansion card holding member 610 is fixed onto the circuit board 400 so that the card receiving slot 611 faces the expansion card slot 210 of the upper housing 211. The card receiving slot 611 is an example of the card receiving slot. The expansion card holding member 610 is an example of the card holding portion. As depicted in FIG. 28, a gap S is provided between the expansion card holding member 610 and the circuit board 400. A processor chip 400a (see FIG. 27) is mounted in the mounting region of the expansion card holding member 610 of the circuit board 400 by utilizing the gap S.

It is preferable that the card holding portion holds a card with a gap between the card holding portion and a circuit board.

The processor chip 400a is mounted in the gap S provided between the expansion card holding member 610 and the circuit board 400 so that the entire device size is reduced.

As depicted in FIG. 28, the expansion card holding member 610 is disposed closer to the inside than an edge Q of the circuit board 400, and a gap is formed between the card receiving slot 611 and the expansion card slot 210.

Figure 29:
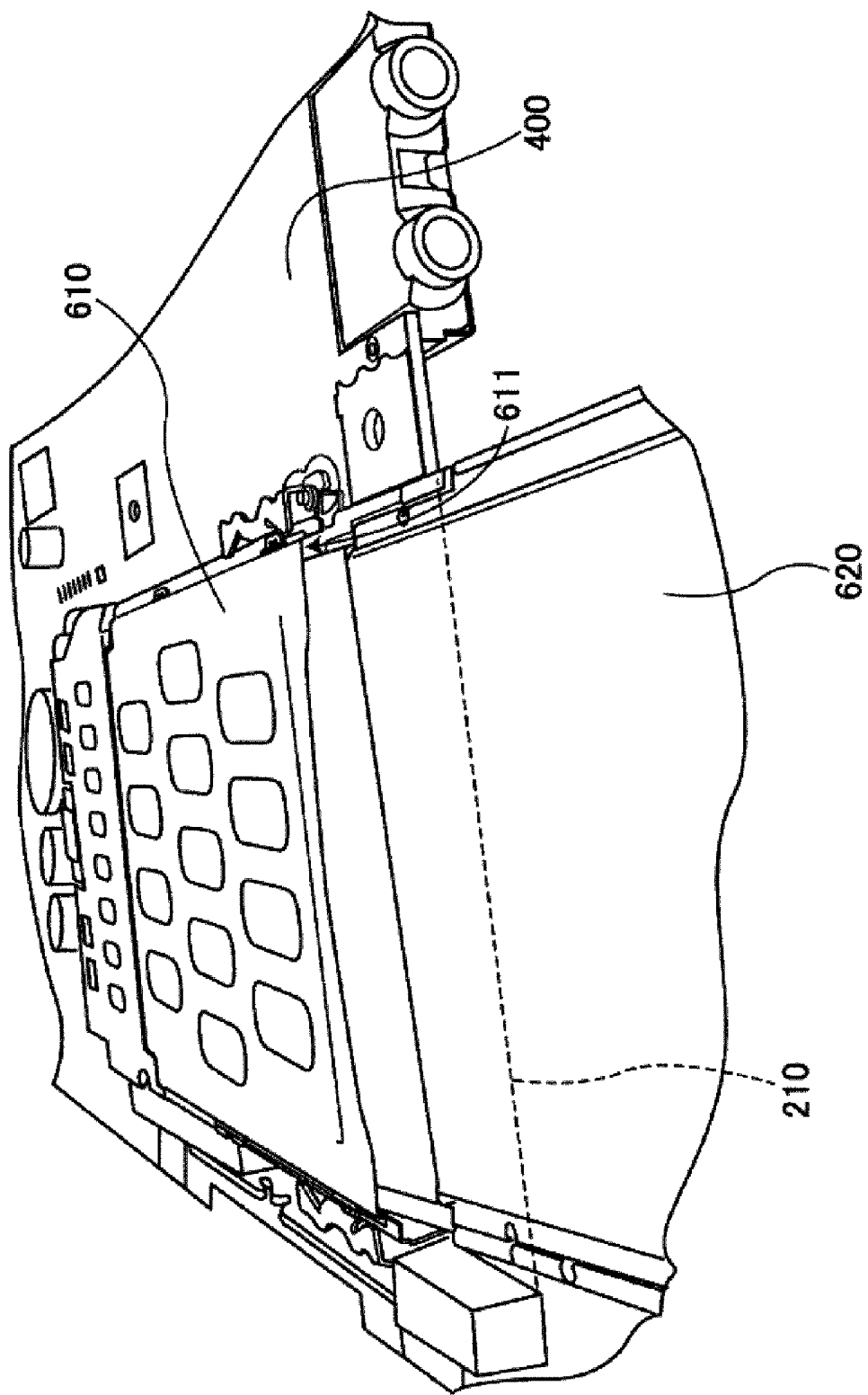
FIG. 29 is a view explaining existing troubles occurring when an expansion card is loaded.

FIG. 29 is a view explaining existing trouble occurring when the expansion card is loaded.

As depicted in FIG. 28, when the card receiving slot 611 and the expansion card slot 210 are provided with a distance therebetween, the expansion card is not guided from the expansion card slot 210 to the card receiving slot 611. Therefore, the expansion card may obliquely enter the expansion card slot 210, whereby, as depicted in FIG. 29, the expansion card 620 may not enter the card receiving slot 611 but enter a gap between the expansion card holding member 610 and the circuit board 400. The expansion card 620 entering the gap may be caught by the expansion card holding member 610, whereby the expansion card 620 may be difficult to remove from the expansion card slot 210. In this embodiment, such a trouble is prevented by a guiding rib 630 (see FIG. 30) which guides the expansion card 620, inserted into the expansion card slot 210, to the card receiving slot 611.

Figure 30:
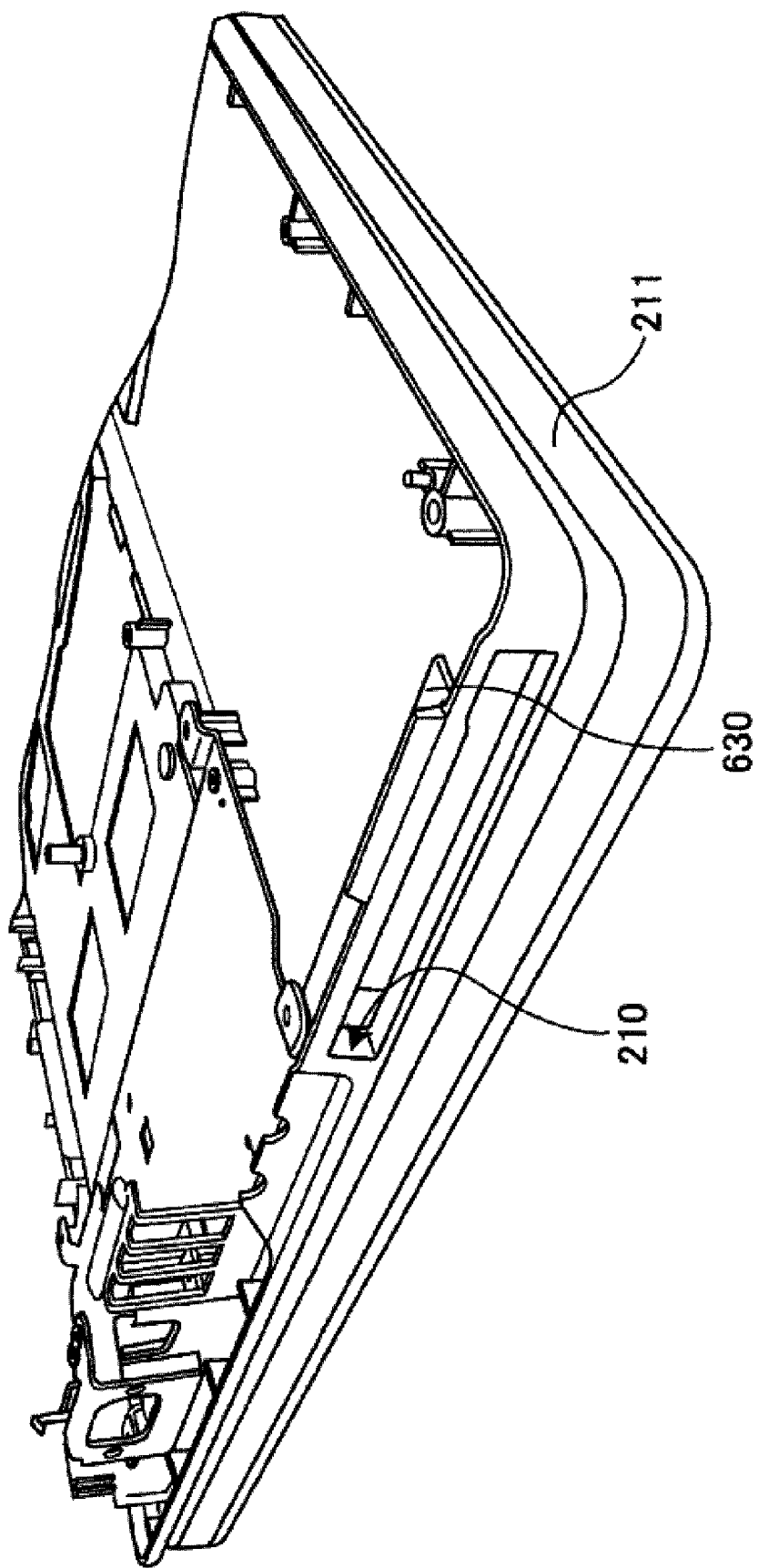
FIG. 30 is an outside view near an expansion card slot of an upper housing with a circuit board removed.
Figure 31:
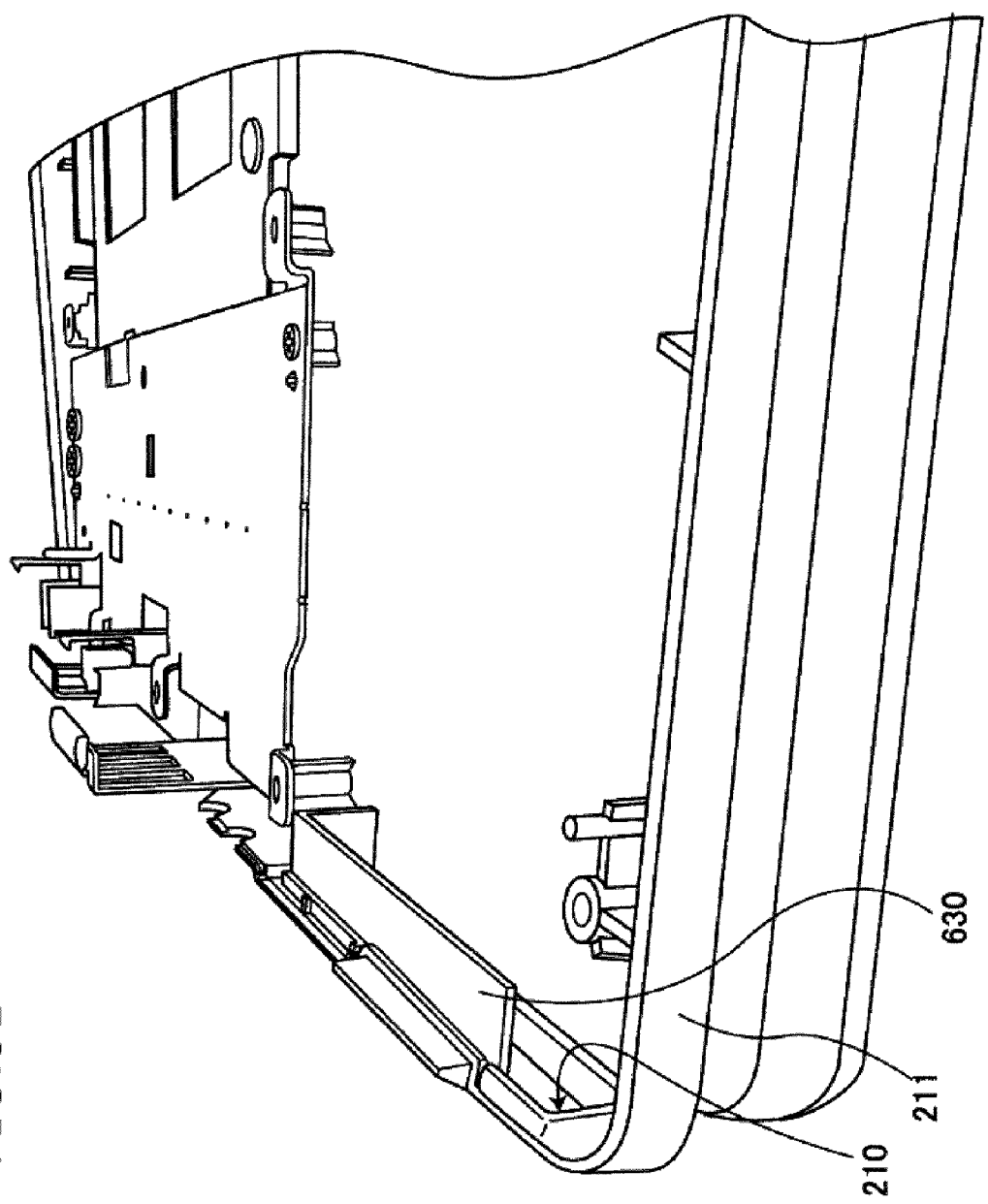
FIG. 31 is an inside view of the expansion card slot.

FIG. 30 is an outside view of the vicinity of the expansion card slot 210 of the upper housing 211 with the circuit board 400 removed. FIG. 31 is an inside view of the expansion card slot 210.

As depicted in FIGS. 30 and 31, the upper housing 211 includes the guiding rib 630 extending from the expansion card slot 210 to the inside of the housing. The guiding rib 630 extends from the edge, which is closer to the circuit board 400 of the expansion card slot 210, to a position near the card receiving slot 611 of the expansion card holding member 610.

Figure 32:
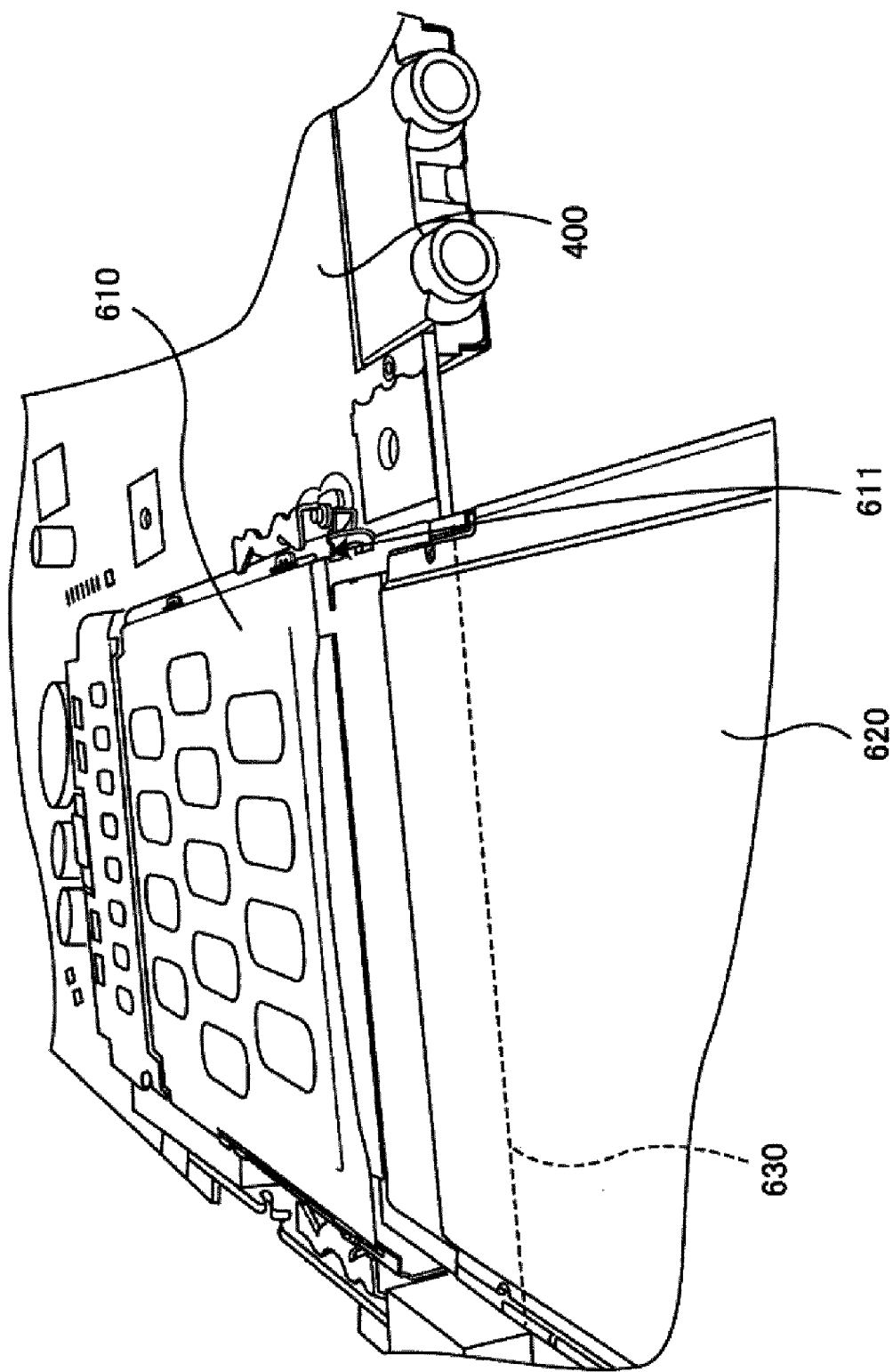
FIG. 32 depicts an inserted expansion card.
Figure 33:
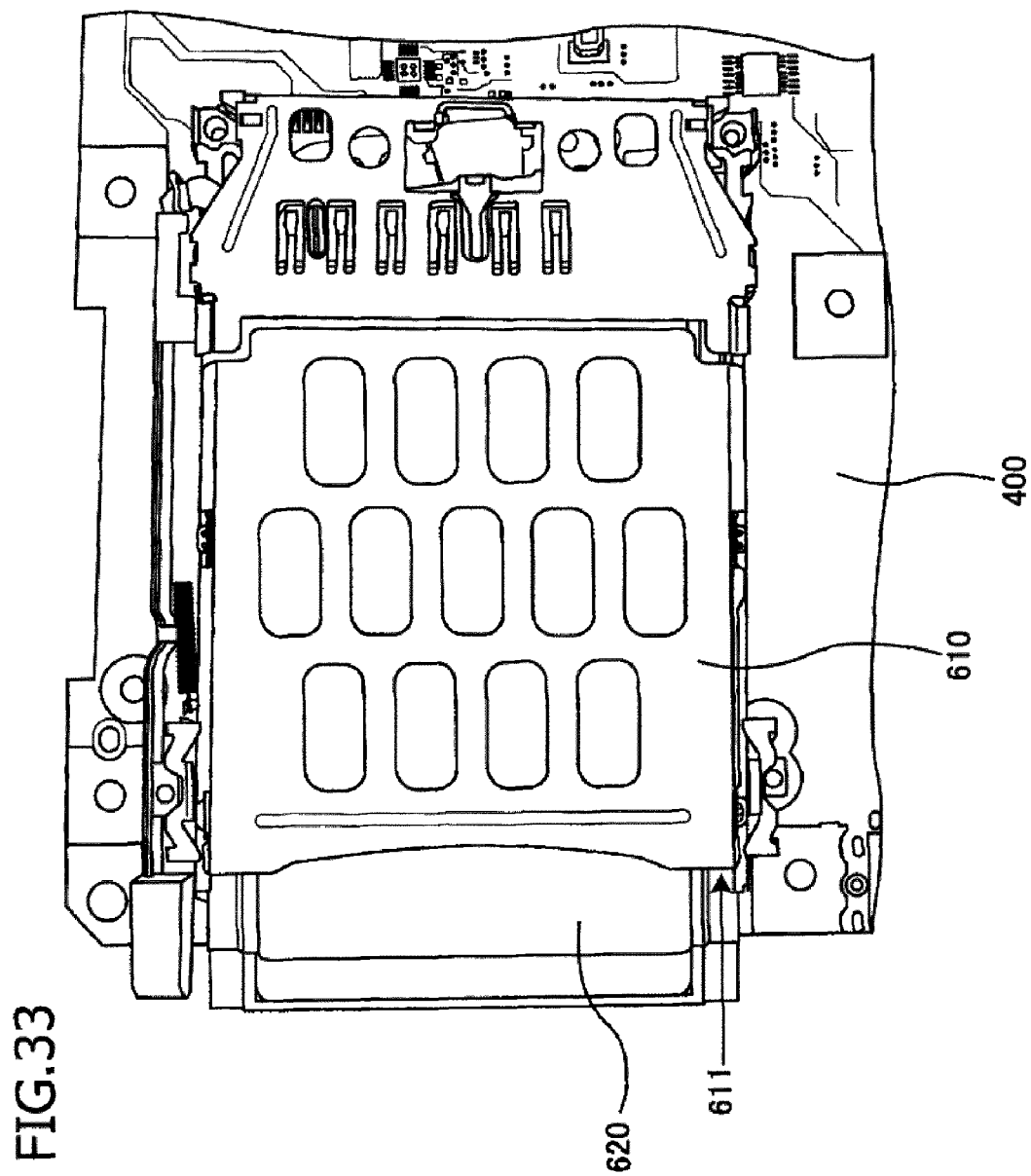
FIG. 33 depicts an expansion card held by an expansion card holding portion.

FIG. 32 depicts the insertion of the expansion card 620 in this embodiment. FIG. 33 depicts the expansion card 620 held by the expansion card holding member 610.

In this embodiment, the expansion card 620 inserted into the expansion card slot 210 is guided to the card receiving slot 611 by the guiding rib 630, and held parallel to the circuit board 400 by the expansion card holding member 610. Therefore, the trouble that the expansion card 620 is obliquely inserted into the expansion card slot 210 to be caught in the gap S (see FIG. 28) between the expansion card holding member 610 and the circuit board 400 is reduced if not prevented, and the expansion card 620 is easily and properly loaded. Further, since the guiding rib 630 is formed in the housing, increases in the device size and cost due to an increase in the number of components is reduced.

It is preferable that the card holding portion holds a card parallel to a substrate, and that the guiding rib extends between the card held by the card holding portion and the substrate.

The guiding rib 630 is formed on the side of the expansion card slot 210, which is closer to the circuit board 400, whereby the guiding rib 630 is positioned between the expansion card 620 held by the expansion card holding member 610 and the circuit board 400. According to this configuration, since the guiding rib 630 blocks the path to the gap S depicted in FIG. 28, such a trouble that the expansion card 620 enters the gap S may be reliably prevented.

The description of the configuration of the expansion card slot 210 ends here.

(Mounting Configuration of Dust Filter)

Subsequently, the mounting configuration of the dust filter 252 also depicted in FIG. 4 will be described.

The personal computer 10 includes:

a housing including an outlet formed in a first surface thereof and a filter storage opening formed in a second surface thereof extending to intersect with the first surface;

a heating electronic component disposed in the housing;

a heat radiating member disposed closer to the outlet than the filter storage opening in the housing, the heat radiating member having an inlet on the filter storage opening side and an outlet on the outlet side and radiating heat received from the heating electronic component to the air flowing through the inlet;

a filter member inserted into the housing through the filter storage opening and disposed on the front surface of the inlet;

a filter receiving portion; and a fan disposed at a position in the housing where the filter member is held between the fan and the heat radiating member and feeding air in the housing into the inlet.

The filter member includes:

a filter portion disposed on the front surface of the inlet and forming a plurality of vents;

a tip supporting portion to support the front end of the filter portion; and a lid portion to support the rear end of the filter portion and to close the filter storage opening when the filter member is inserted through the filter storage opening.

The filter receiving portion receiving, at a position away from the inlet, the tip supporting portion passing through the front of the inlet when the filter member is inserted through the filter storage opening.

The lid portion has such a dimension that the filter storage opening is closed when the tip supporting portion is supported by the filter receiving portion.

Figure 34:
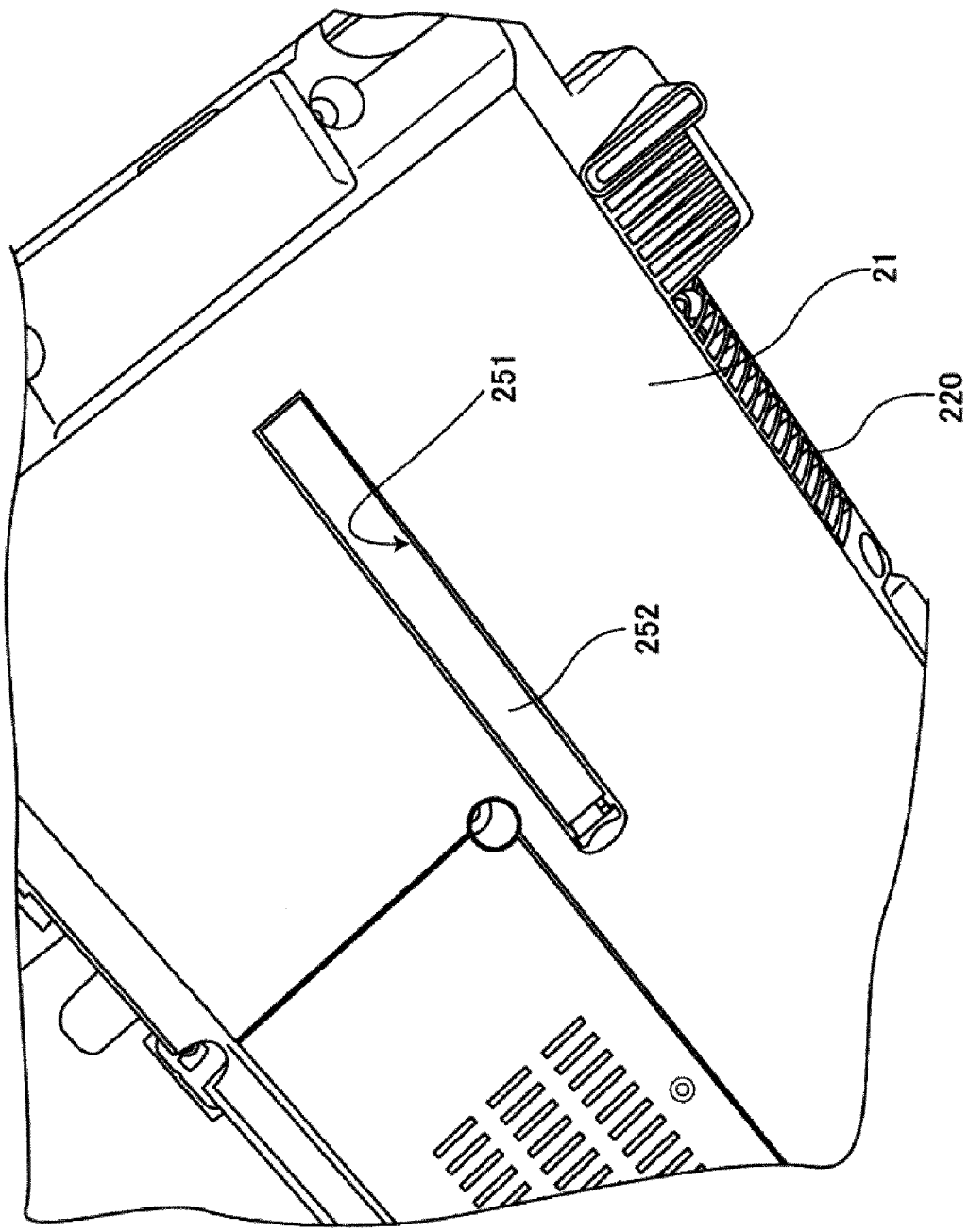
FIG. 34 is an enlarged view near a filter storage opening of a bottom surface of a personal computer.
Figure 35:
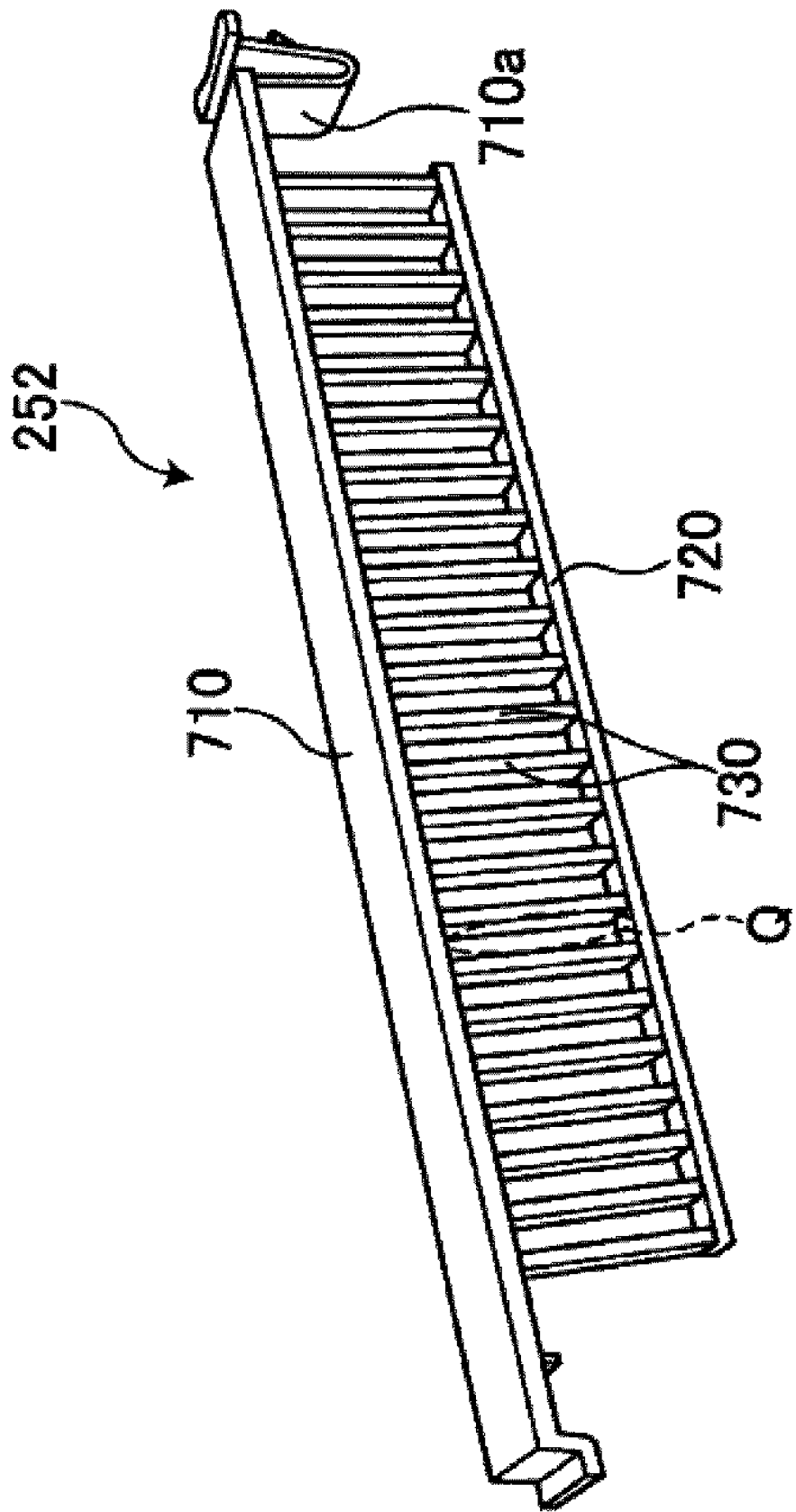
FIG. 35 depicts a dust filter.

FIG. 34 is an enlarged view of the vicinity of the filter storage opening 251 on the bottom surface of the personal computer 10 depicted in FIG. 4. FIG. 35 depicts the dust filter 252.

As depicted in FIG. 34, the main housing 21 of the personal computer 10 includes the outlet 220 provided on the rear surface side. The main housing 21 includes, on its bottom surface, the filter storage opening 251 through which the dust filter 252 is inserted. The outlet 220 is an example of the outlet. The filter storage opening 251 is an example of the filter storage opening.

As depicted in FIG. 35, the dust filter 252 includes a lid portion 710, a tip supporting portion 720, and a plurality of plate members 730. The lid portion 710 has a handle 710a. The tip supporting portion 720 is inserted into the filter storage opening 251. The plate members 730 are arranged between the lid portion 710 and the tip supporting portion 720 so as to be parallel to each other, and a plurality of vents Q are formed by the plate members 730. When the dust filter 252 is loaded into the filter storage opening 251 depicted in FIG. 34, the filter storage opening 251 is closed by the lid portion 710. The dust filter 252 is an example of the filter member. The plate members 730 are an example of the filter portion. The tip supporting portion 720 is an example of the tip supporting portion. The lid portion 710 is an example of the lid portion.

Figure 36:
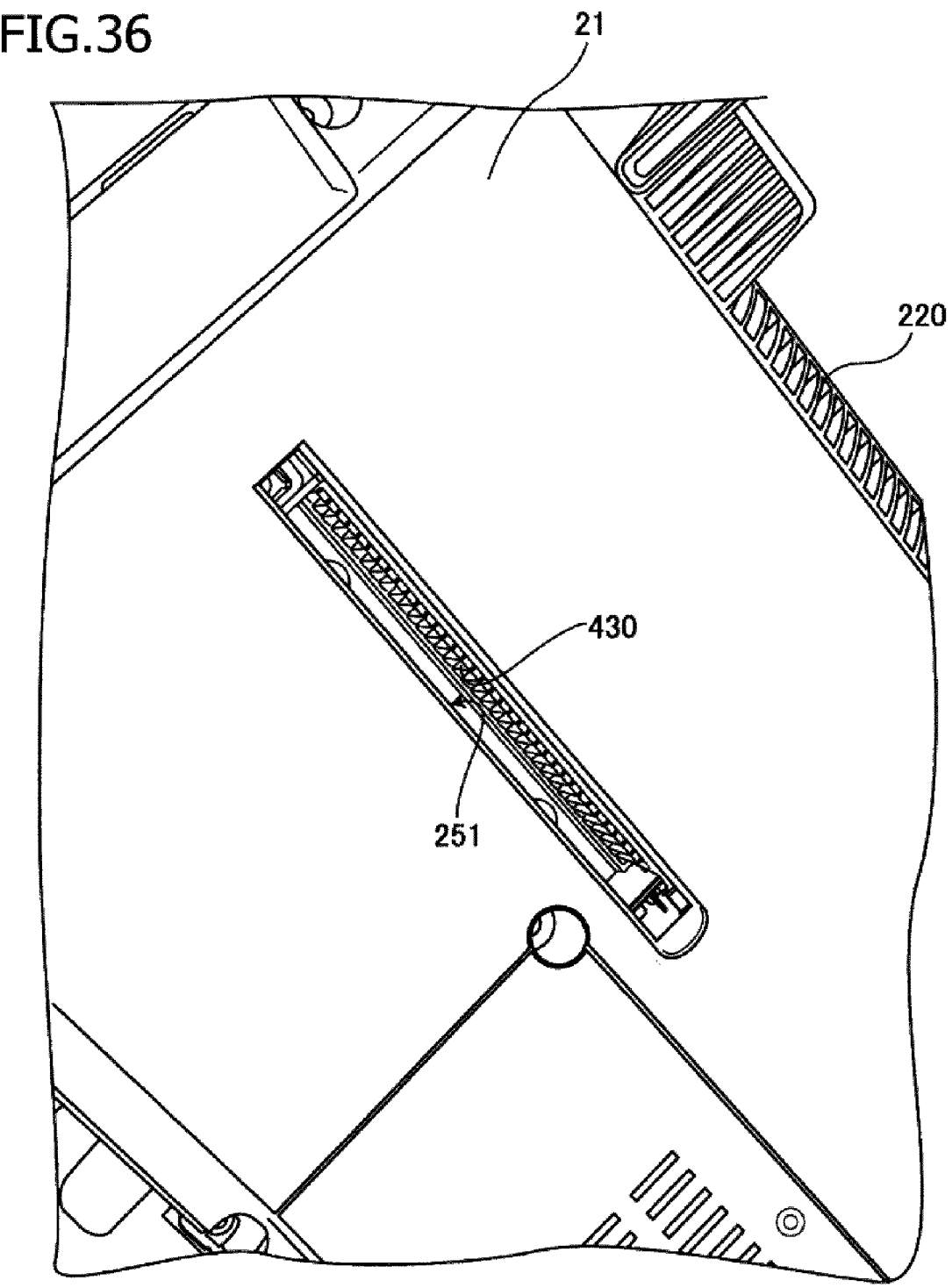
FIG. 36 depicts a filter storage opening with a dust filter removed.

FIG. 36 depicts the filter storage opening 251 with the dust filter 252 removed.

When the dust filter 252 is removed from the filter storage opening 251, some heat radiating fins 431 (see FIG. 37) of the heat radiating member 430 depicted in FIG. 10 are exposed by the filter storage opening 251.

Figure 37:
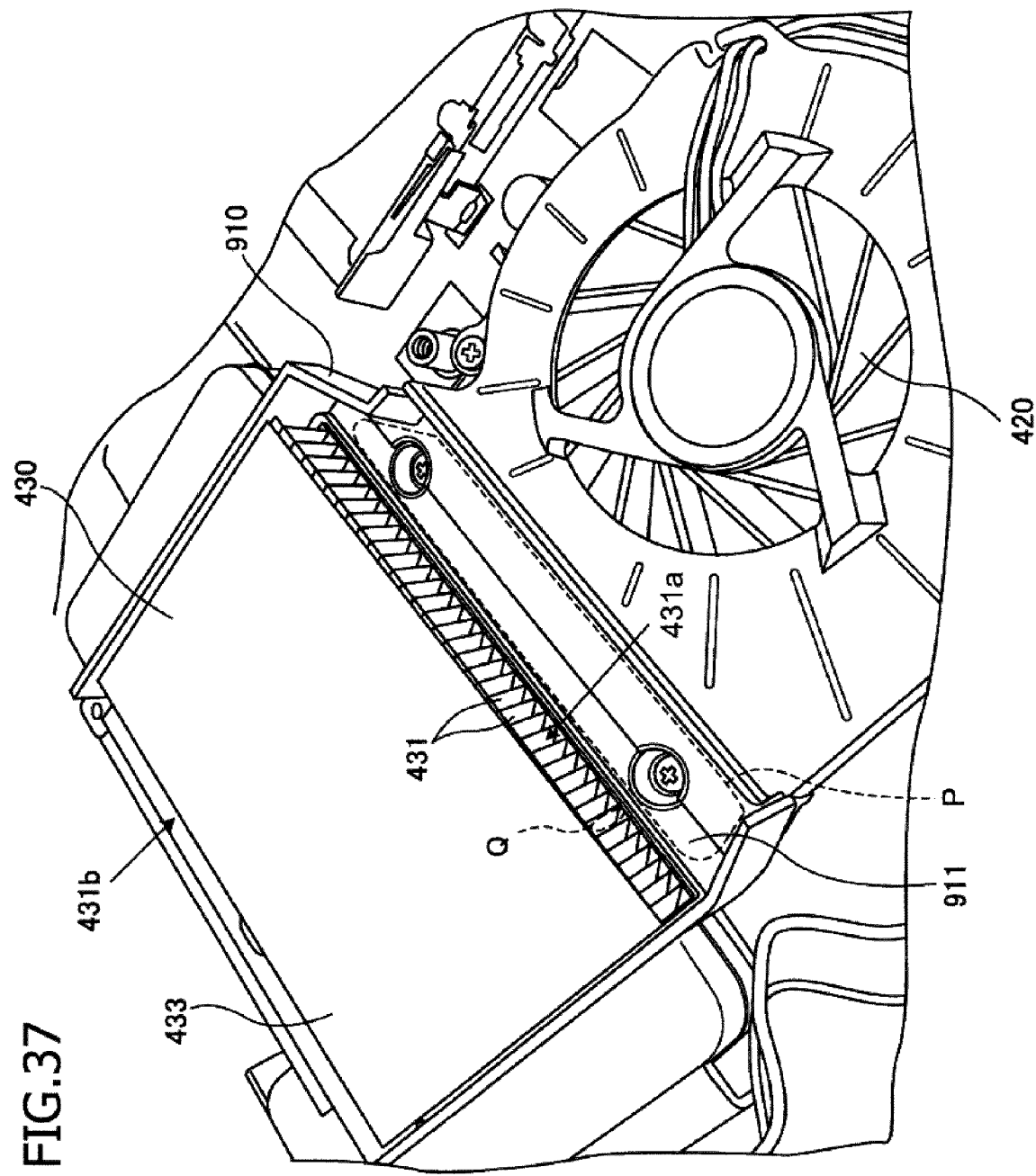
FIG. 37 is an enlarged view of a portion corresponding to the filter storage opening in a main housing.
Figure 38:
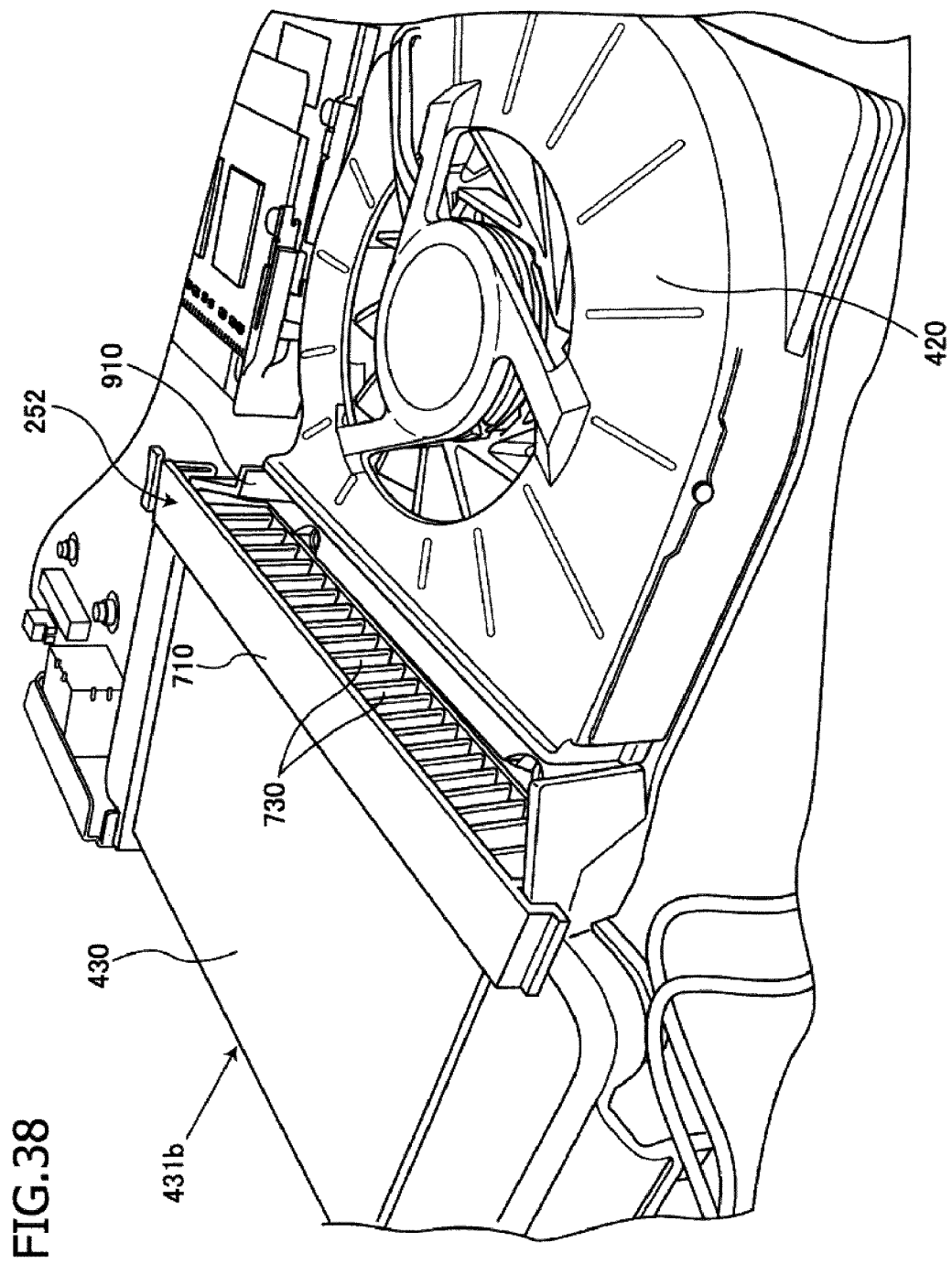
FIG. 38 depicts a mounted dust filter.

FIG. 37 is an enlarged view of a portion corresponding to the filter storage opening 251 in the main housing 21. FIG. 38 depicts the mounted dust filter 252.

The heat radiating member 430 and the fan 420 are provided in the main housing 21. The heat radiating member 430 is disposed closer to the outlet 220 than a filter mounting position P corresponding to the filter storage opening 251. The fan 420 is disposed further toward the inside of the main housing 21 than the heat radiating member 430. The heat radiating member 430 and the fan 420 are connected by a supporting portion 910. The supporting portion 910 includes, at the filter mounting position P, a filter receiving portion 911 to which the tip supporting portion 720 of the dust filter 252 is mounted.

The heat radiating member 430 includes an inlet 431a and an outlet 431b. The inlet 431a includes a plurality of the heat radiating fins 431 arranged in a row, and the air sent from the fan 420 flows into the inlet 431a. The outlet 431b faces the outlet 220 of the main housing 21. The heat radiating member 430 is an example of the heat radiating member. The fan 420 is an example of the fan. The inlet 431a is an example of the inlet. The outlet 431b is an example of the outlet.

As depicted in FIG. 38, the dust filter 252 is disposed between the fan 420 and the inlet 431a of the heat radiating member 430, and the tip supporting portion 720 is fitted into the filter receiving portion 911.

The air sent from the fan 402 passes through the vents Q formed by the plate members 730 of the dust filter 252 to reach the inlet 431a of the heat radiating member 430. The heat generated in various electronic components is absorbed by a heatsink 433 and transferred to the air flowing through the inlet 431a. The air absorbing the heat passes through spaces, respectively held by the heat radiating fins 431, to be discharged outside the housing through the outlet 220.

Figure 39:
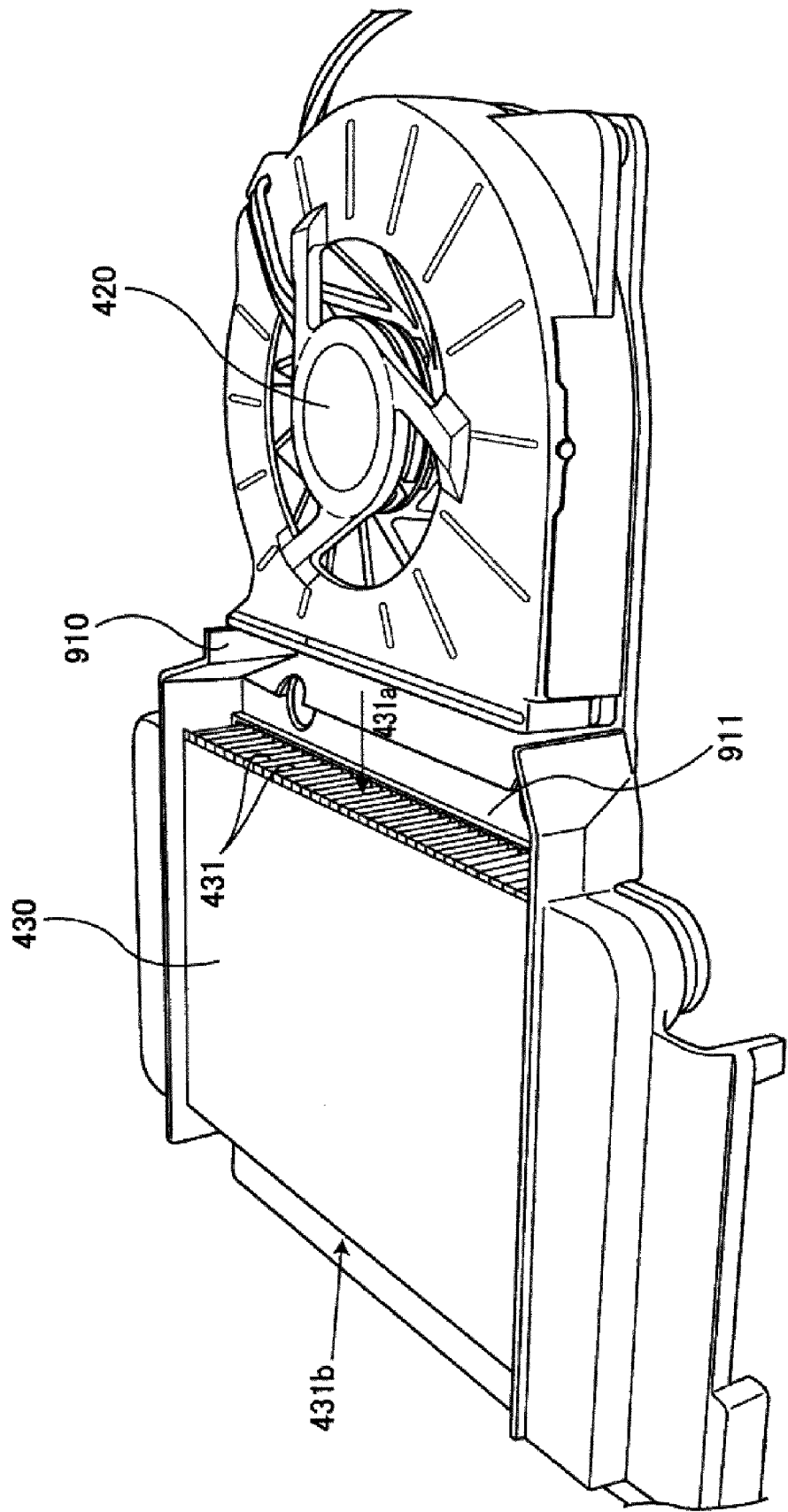
FIG. 39 depicts a heat radiating member and a fan connected by a supporting portion.

FIG. 39 depicts the heat radiating member 430 and the fan 420 coupled by the supporting portion 910.

As depicted in FIG. 39, the supporting portion 910 has the filter receiving portion 911 provided at a position lower than the lower ends of the heat radiating fins 431 of the heat radiating member 430 and formed in the shape of a groove. The tip supporting portion 720 of the dust filter 252 is fitted into the filter receiving portion 911.

It is preferable to provide a supporting portion which supports the heat radiating member and the fan and includes the filter receiving portion, and it is preferable that the filter receiving portion is formed in the shape of a groove and receives the tip supporting portion.

The filter receiving portion 911 is easily formed by forming the shape of a groove in the supporting portion 910 supporting the heat radiating member 430 and the fan 420. The supporting portion 910 is an example of the supporting portion.

Figure 40:
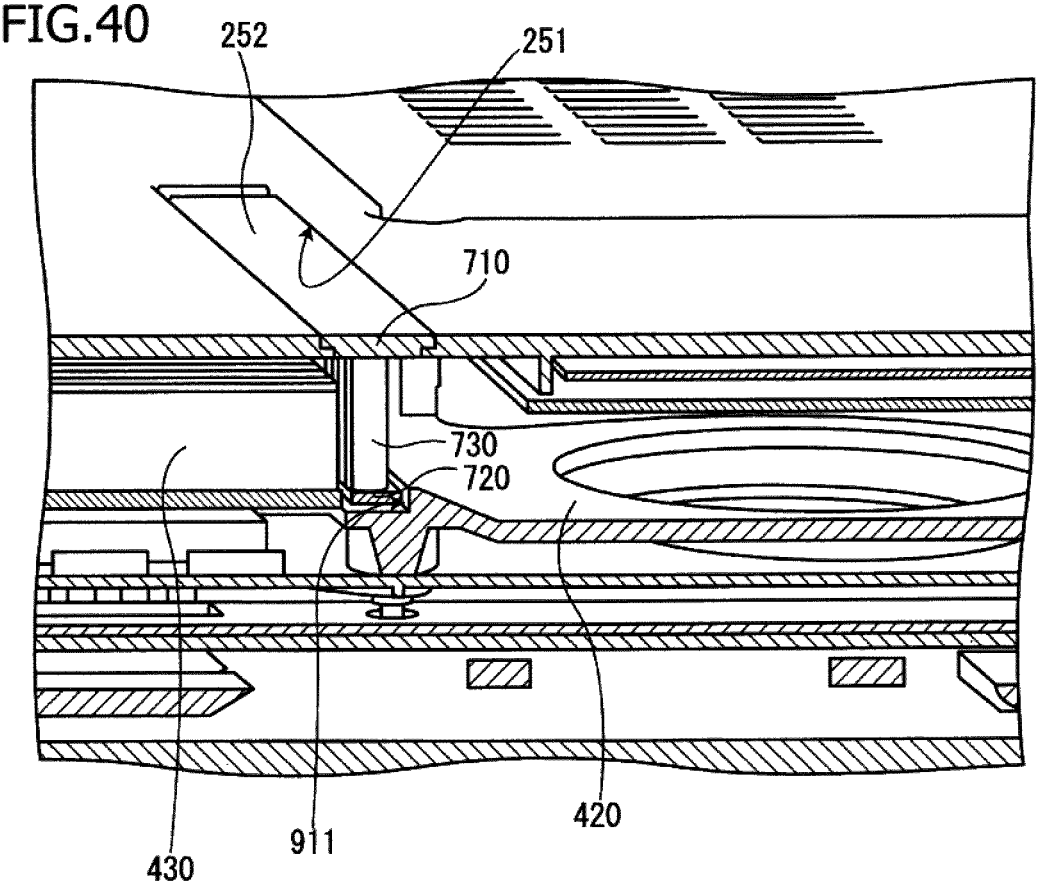
FIG. 40 is a cross-sectional view of a personal computer near a heat radiating member and a fan mounted on a personal computer.

FIG. 40 is a cross-sectional view of the personal computer 10 near the heat radiating member 430 and the fan 420 mounted on the personal computer 10.

FIG. 40 depicts the bottom surface of the personal computer 10 turned upward. As depicted in FIG. 40, the tip supporting portion 720 of the dust filter 252 enters the filter receiving portion 911 so that the plate members 730 of the dust filter 252 are positioned lower than the heat radiating fins 431 of the heat radiating member 430. The plate members 730 of the dust filter 252 are longer than the heat radiating fins 431 of the heat radiating member 430.

It is preferable that the heat radiating member has a plurality of heat radiating fins aligned so that the end surfaces of the heat radiating members are positioned at the inlet and the outlet, and that the filter portion includes a plurality of members that extend to a position between the lid portion and the tip supporting portion so as to be parallel to each other and are aligned at a wider interval than the alignment interval of the heat radiating fins.

According to the above configuration, the entry of dust into the inlet can be efficiently reduced if not prevented, whereby the blocking of air flow due to the dust filter 252 may be reduced if not prevented.

Figure 41:
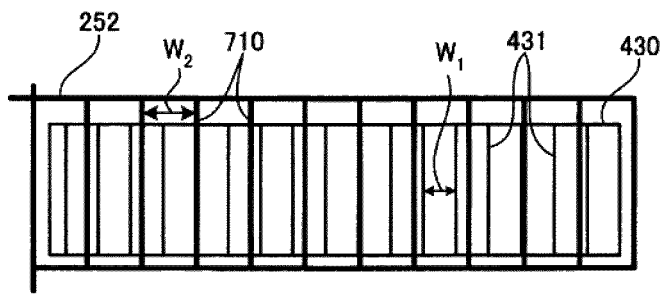
FIG. 41 is a view of a dust filter and heat radiating fins as viewed from the side of an inlet.

FIG. 41 is a view of the dust filter 252 and the heat radiating fins 431 as viewed from the side of the inlet 431a.

As depicted in FIG. 41, an alignment interval W2 of the plate members 730 of the dust filter 252 is larger than an alignment interval W1 of the heat radiating fins 431. Since the plate members 730 of the dust filter 252 are positioned further outside than the both ends of the heat radiating fins 431, an air flow path formed by the heat radiating fins 431 is not impeded by the lid portion 710 and the tip supporting portion 720 of the dust filter 252. The air sent by the fan 42 passes through gaps between the plate members 730 of the dust filter 252 to reach the inlet 431a, and passes through the outlet 431b to be discharged from the outlet 220. Since the blocking of the air flow due to the dust filter 252 is reduced if not prevented, reduction of the heat radiating efficiency due to the mounting of the dust filter 252 is suppressed, and problems caused by dust entering the inlet 431a may be reduced if not prevented.

In the above embodiment, the personal computer is used as an example of an electronic apparatus. However, the electronic apparatus may be various apparatuses such as a notebook computer, a PDA, a game machine, a television, or a portable telephone.

In the above embodiment, although the dust filter uses a plurality of the plate members aligned parallel, a filter portion of the filter member may be formed into, for example, a net.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. An electronic apparatus comprising:
   a circuit board including a connector mounted at an end edge and a metal member reinforcing the connector, the connector including a fitting surface of the connector facing outside;
   a housing which accommodates the circuit board and includes a first opening for a keyboard arrangement formed in an upper surface thereof and a second opening for fitting with a mating connector formed on a side surface thereof, the second opening facing the fitting surface of the connector mounted on the circuit board; and a keyboard exposed to the outside from the first opening and having a plurality of keys arranged on an upper surface thereof, wherein the metal member extends under the keyboard and supports a portion of the lower surface of the keyboard.

2. The electronic apparatus according to claim 1, further comprising:

a mounting member having an opening, from which the metal member facing the lower surface of the keyboard is partially exposed, and to support the keyboard in cooperation with the metal member when the lower surface of the keyboard is placed on the mounting member.

3. The electronic apparatus according to claim 1, wherein the connector is mounted on a first surface of the circuit board facing the bottom surface side of the housing, and the metal member includes a first portion, which reinforces the connector on the first surface side, and a second portion which wraps around and extends from the first surface side of the circuit board to the second surface side of the circuit board and supports the keyboard.

4. The electronic apparatus according to claim 1, further comprising:

a display panel, and a second housing to hold the display panel and is connected to the housing such that the second housing may be opened and closed.

* * * * *